US008526961B2

(12) United States Patent
Sanders et al.

(10) Patent No.: US 8,526,961 B2
(45) Date of Patent: Sep. 3, 2013

(54) METHOD AND APPARATUS FOR MAPPING OPERATING PARAMETER IN COVERAGE AREA OF WIRELESS NETWORK

(75) Inventors: Susan W. Sanders, Bridgewater, NJ (US); Tian Bu, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/172,118

(22) Filed: Jun. 29, 2011

(65) Prior Publication Data
US 2013/0005297 A1    Jan. 3, 2013

(51) Int. Cl.
H04M 11/00    (2006.01)
H04W 24/00    (2009.01)
H04B 7/212    (2006.01)
G01S 3/02    (2006.01)

(52) U.S. Cl.
USPC ........ 455/446; 455/456.1; 455/405; 370/321; 342/451

(58) Field of Classification Search
USPC ...... 455/456.1, 447, 446; 370/321; 701/213; 342/451
See application file for complete search history.

(56) References Cited

U.S. PATENT DOCUMENTS

| 6,785,536 | B1 * | 8/2004 | Lee et al. ................ 455/408 |
| 7,593,732 | B2 * | 9/2009 | Kim et al. ................ 455/436 |
| 2003/0148774 | A1 * | 8/2003 | Naghian et al. ............. 455/456 |
| 2004/0196800 | A1 * | 10/2004 | Padovani et al. ............. 370/321 |
| 2005/0227709 | A1 * | 10/2005 | Chang et al. ............... 455/456.1 |
| 2007/0275732 | A1 | 11/2007 | Jethwa et al. |
| 2008/0032706 | A1 * | 2/2008 | Sheynblat et al. ......... 455/456.1 |
| 2008/0186234 | A1 | 8/2008 | Alles et al. |
| 2009/0275339 | A1 | 11/2009 | Weaver |
| 2011/0130137 | A1 | 6/2011 | Sanders et al. |
| 2011/0131317 | A1 | 6/2011 | Sanders et al. |
| 2011/0205122 | A1 * | 8/2011 | Siomina et al. ............... 342/387 |

FOREIGN PATENT DOCUMENTS
WO    2011/019916 A1    2/2011

OTHER PUBLICATIONS

PCT Patent Application No. PCT/US2012/044490, International Search Report, mailed Sep. 10, 2012, 5 pages.
PCT Patent Application No. PCT/US2012/044490, Written Opinion of the International Searching Authority, mailed Sep. 10, 2012, 7 pages.
Ng, Self-Aware Wireless Sensor Network: A Joint Localisation and Orientation Approach, Wireless Communications and Signal Processing (WCSP), 2010 International Conference on, IEEE, Piscataway, NJ, USA, Oct. 12, 2010, 6 pages.

* cited by examiner

*Primary Examiner* — Nizar Sivji
(74) *Attorney, Agent, or Firm* — Fay Sharpe LLP

(57) ABSTRACT

A method for mapping an operating parameter in a coverage area of a wireless network includes obtaining parameter measurements for an operating parameter associated with mobile stations operating in a select portion of a network coverage area for a wireless network, the network coverage area formed by base stations defining cellular coverage areas, the select portion formed by at least one base station, each at least one base station including multiple sector antennas, each sector antenna defining a sector coverage area within the cellular coverage area; and, for each obtained parameter measurement, estimating an instant geographic location of the mobile station in relation to the at least one base station serving the mobile station, each instant geographic location based on a round trip measurement and a signal strength measurement associated with the mobile station, each round trip measurement associated with the serving base station.

24 Claims, 27 Drawing Sheets

○ ESTIMATED MOBILE LOCATION

SERVING BS

○ ESTIMATED MOBILE LOCATION

402
DETERMINING A RADIAL DISTANCE OF A MOBILE STATION FROM A BASE STATION SERVING THE MOBILE STATION, THE BASE STATION INCLUDING MULTIPLE SECTOR ANTENNAS, THE RADIAL DISTANCE BASED AT LEAST IN PART ON A ROUND TRIP MEASUREMENT ASSOCIATED WITH ELAPSED TIME BETWEEN SENDING AN OUTGOING SIGNAL FROM THE BASE STATION TO THE MOBILE STATION AND RECEIVING A CORRESPONDING ACKNOWLEDGEMENT SIGNAL FROM THE MOBILE STATION AT THE BASE STATION

404
CALCULATING A CURRENT ANGULAR POSITION OF THE MOBILE STATION IN RELATION TO THE RADIAL DISTANCE FROM THE SERVING BASE STATION BASED AT LEAST IN PART ON A FIRST SIGNAL STRENGTH MEASUREMENT, A SECOND SIGNAL STRENGTH MEASUREMENT, AND AN ANGULAR POSITION REFERENCE THAT EXTENDS OUTWARD FROM THE SERVING BASE STATION, THE FIRST AND SECOND SIGNAL STRENGTH MEASUREMENTS REPRESENTATIVE OF POWER CHARACTERISTICS OF RESPECTIVE RF SIGNALS RECEIVED BY THE MOBILE STATION FROM CORRESPONDING FIRST AND SECOND SECTOR ANTENNAS OF THE SERVING BASE STATION

502
IDENTIFYING A CURRENT GEOGRAPHIC LOCATION OF THE MOBILE STATION IN A COVERAGE AREA OF THE WIRELESS NETWORK IN A GEOGRAPHIC NOTATION BASED AT LEAST IN PART ON COMBINING THE RADIAL DISTANCE AND CURRENT ANGULAR POSITION OF THE MOBILE STATION RELATIVE TO THE SERVING BASE STATION

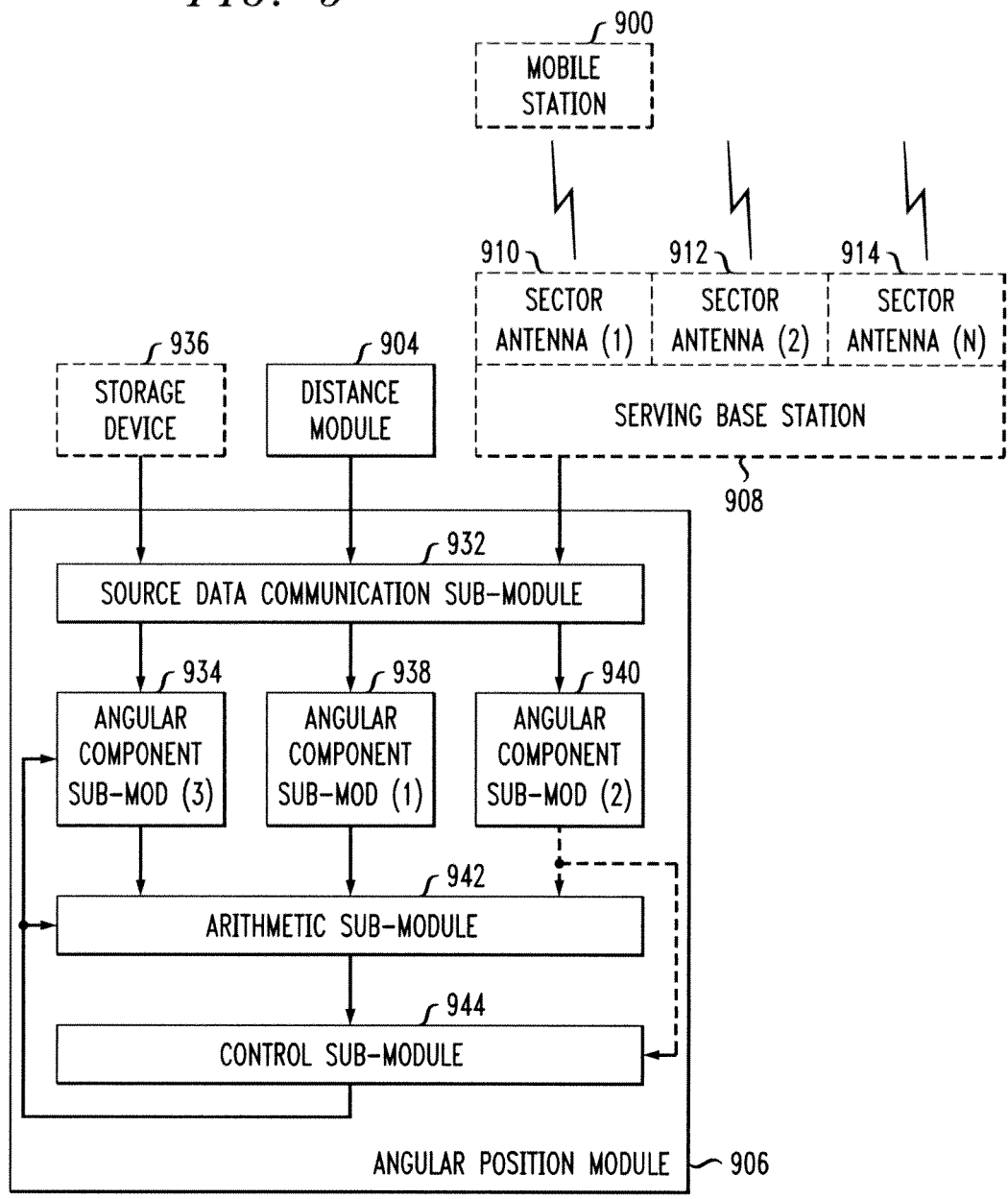

1002
CALCULATING A RADIAL DISTANCE OF A MOBILE STATION FROM A BASE STATION, THE BASE STATION INCLUDING MULTIPLE SECTOR ANTENNAS, THE RADIAL DISTANCE BASED AT LEAST IN PART ON A ROUND TRIP MEASUREMENT ASSOCIATED WITH ELAPSED TIME BETWEEN SENDING AN OUTGOING SIGNAL FROM THE BASE STATION TO THE MOBILE STATION AND RECEIVING A CORRESPONDING ACKNOWLEDGEMENT SIGNAL FROM THE MOBILE STATION AT THE BASE STATION

1004
DETERMINING A SIGNAL STRENGTH REPORT FROM THE MOBILE STATION PROVIDED TO THE BASE STATION INCLUDES A SIGNAL STRENGTH MEASUREMENT REPRESENTATIVE OF A POWER CHARACTERISTIC OF AN RF SIGNAL RECEIVED BY THE MOBILE STATION FROM A SECTOR ANTENNA OF THE BASE STATION

1006
IDENTIFY AN INSTANT GEOGRAPHIC LOCATION OF THE MOBILE STATION IN A COVERAGE AREA OF THE WIRELESS NETWORK

1700 FIG. 17
/ 1702

CALCULATING AN INSTANT ANGULAR POSITION OF AN INDIVIDUAL MOBILE STATION IN RELATION TO A FIRST BASE STATION, THE FIRST BASE STATION INCLUDING MULTIPLE SECTOR ANTENNAS, THE INSTANT ANGULAR POSITION BASED AT LEAST IN PART ON A FIRST SIGNAL STRENGTH MEASUREMENT, A SECOND SIGNAL STRENGTH MEASUREMENT, AND AN ANGULAR POSITION REFERENCE THAT EXTENDS OUTWARD FROM THE FIRST BASE STATION, THE FIRST AND SECOND SIGNAL STRENGTH MEASUREMENTS RELATED IN CALENDAR TIME AND REPRESENTATIVE OF POWER CHARACTERISTICS OF RESPECTIVE RADIO FREQUENCY (RF) SIGNALS RECEIVED BY THE INDIVIDUAL MOBILE STATION FROM CORRESPONDING FIRST AND SECOND SECTOR ANTENNAS OF THE FIRST BASE STATION

DETERMINING A RADIAL DISTANCE OF THE INDIVIDUAL MOBILE STATION FROM THE FIRST BASE STATION, THE RADIAL DISTANCE BASED AT LEAST IN PART ON A ROUND TRIP MEASUREMENT ASSOCIATED WITH ELAPSED TIME BETWEEN SENDING AN OUTGOING SIGNAL FROM THE FIRST BASE STATION TO THE INDIVIDUAL MOBILE STATION AND RECEIVING A CORRESPONDING ACKNOWLEDGEMENT SIGNAL FROM THE INDIVIDUAL MOBILE STATION AT THE FIRST BASE STATION, THE ROUND TRIP MEASUREMENT RELATED IN CALENDAR TIME TO THE FIRST AND SECOND SIGNAL STRENGTH MEASUREMENTS

DETERMINING A RADIAL DISTANCE OF THE INDIVIDUAL MOBILE STATION FROM A SECOND BASE STATION SERVING THE INDIVIDUAL MOBILE STATION, THE SECOND BASE STATION INCLUDING MULTIPLE SECTOR ANTENNAS, THE RADIAL DISTANCE BASED AT LEAST IN PART ON A ROUND TRIP MEASUREMENT ASSOCIATED WITH ELAPSED TIME BETWEEN SENDING AN OUTGOING SIGNAL FROM THE SECOND BASE STATION TO THE INDIVIDUAL MOBILE STATION AND RECEIVING A CORRESPONDING ACKNOWLEDGEMENT SIGNAL FROM THE INDIVIDUAL MOBILE STATION AT THE SECOND BASE STATION, THE ROUND TRIP MEASUREMENT RELATED IN CALENDAR TIME TO THE FIRST AND SECOND SIGNAL STRENGTH MEASUREMENTS

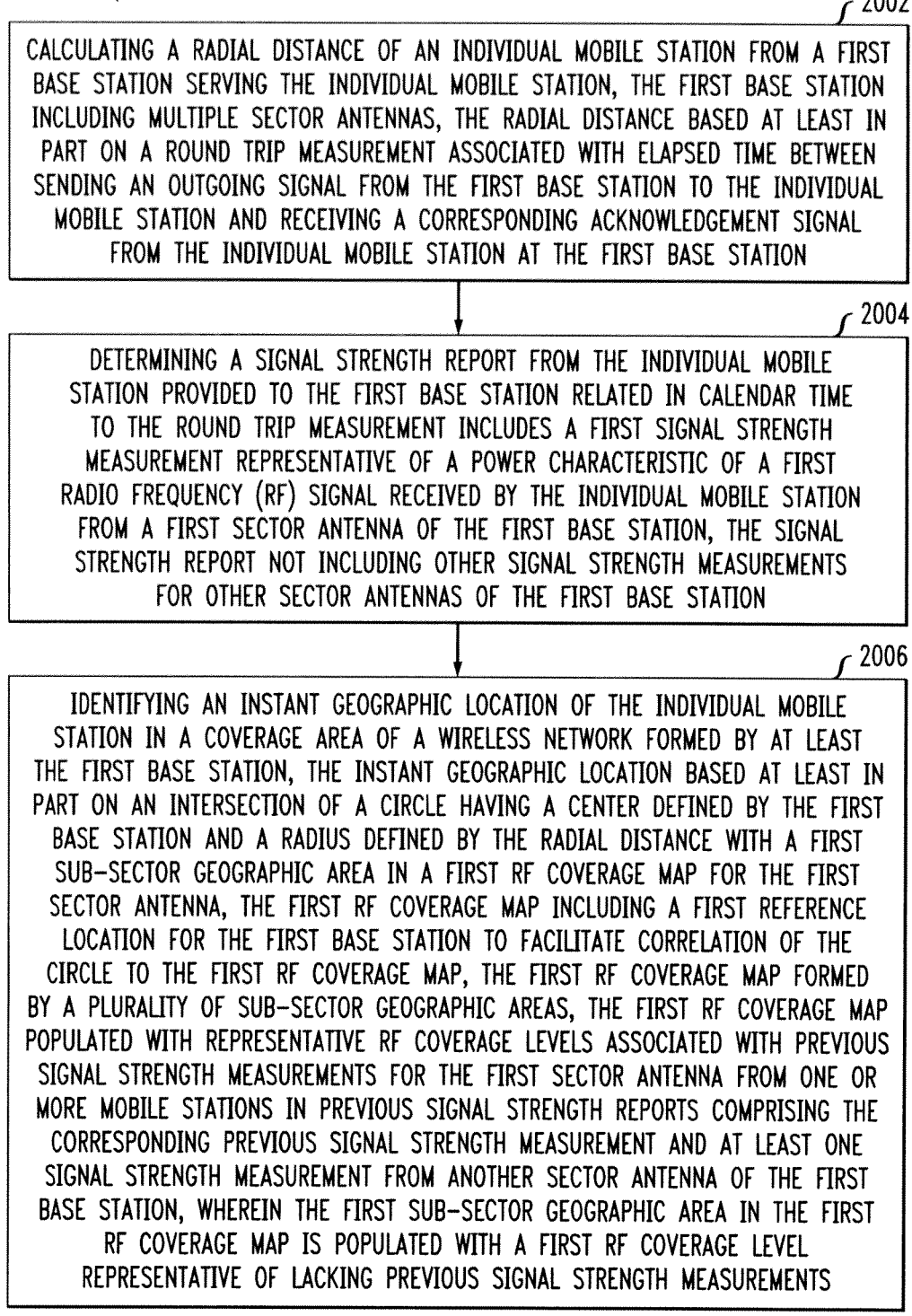

FIG. 27
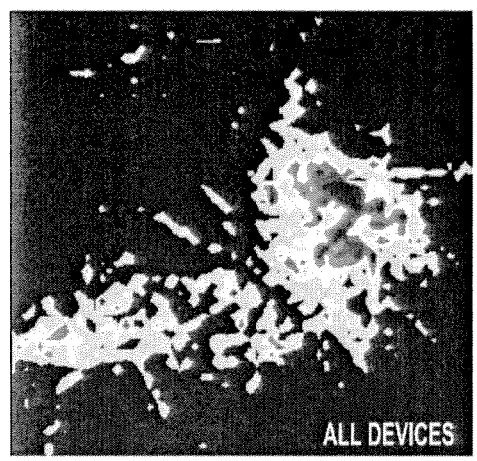
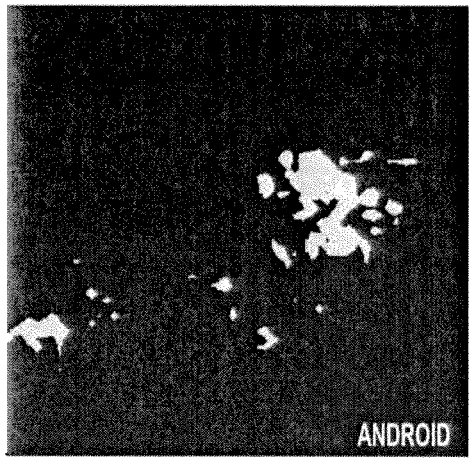
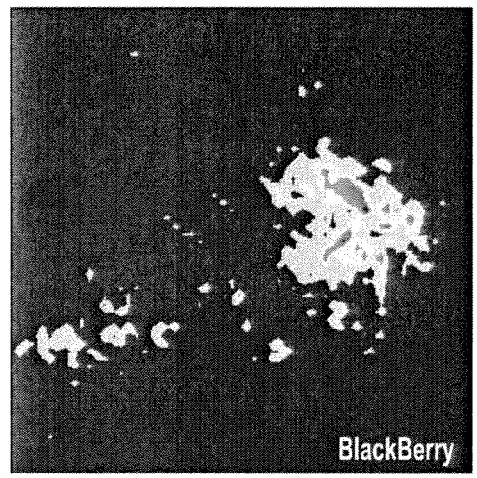
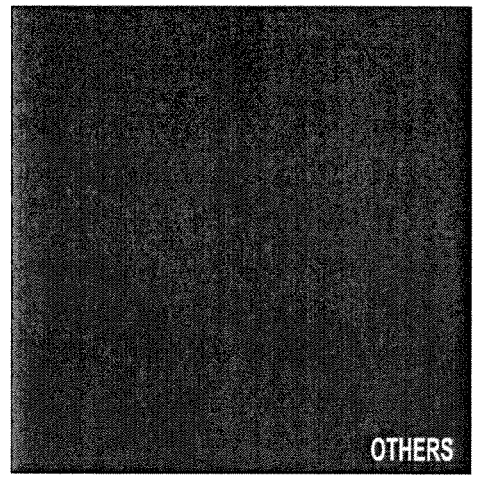

OBTAINING PARAMETER MEASUREMENTS FOR A SELECT OPERATING PARAMETER ASSOCIATED WITH ONE OR MORE MOBILE STATIONS OPERATING IN AT LEAST A SELECT PORTION OF A NETWORK COVERAGE AREA FOR A WIRELESS NETWORK, THE PARAMETER MEASUREMENTS HAVING BEEN MEASURED DURING A SELECT CALENDAR TIMEFRAME, THE NETWORK COVERAGE AREA FORMED BY A PLURALITY OF BASE STATIONS, EACH BASE STATION DEFINING A CELLULAR COVERAGE AREA WITHIN THE NETWORK COVERAGE AREA, THE SELECT PORTION OF THE NETWORK COVERAGE AREA FORMED BY AT LEAST ONE BASE STATION, EACH AT LEAST ONE BASE STATION INCLUDING MULTIPLE SECTOR ANTENNAS, EACH SECTOR ANTENNA DEFINING A SECTOR COVERAGE AREA WITHIN THE CELLULAR COVERAGE AREA FOR THE CORRESPONDING BASE STATION

2804

FOR EACH OBTAINED PARAMETER MEASUREMENT, ESTIMATING AN INSTANT GEOGRAPHIC LOCATION OF THE CORRESPONDING MOBILE STATION IN RELATION TO THE AT LEAST ONE BASE STATION SERVING THE CORRESPONDING MOBILE STATION, EACH INSTANT GEOGRAPHIC LOCATION BASED AT LEAST IN PART ON A ROUND TRIP MEASUREMENT AND AT LEAST ONE SIGNAL STRENGTH MEASUREMENT ASSOCIATED WITH THE CORRESPONDING MOBILE STATION, EACH ROUND TRIP MEASUREMENT ASSOCIATED WITH THE AT LEAST ONE BASE STATION SERVING THE CORRESPONDING MOBILE STATION, EACH ROUND TRIP MEASUREMENT AND CORRESPONDING AT LEAST ONE SIGNAL STRENGTH MEASUREMENT RELATED IN CALENDAR TIME TO THE CORRESPONDING PARAMETER MEASUREMENT

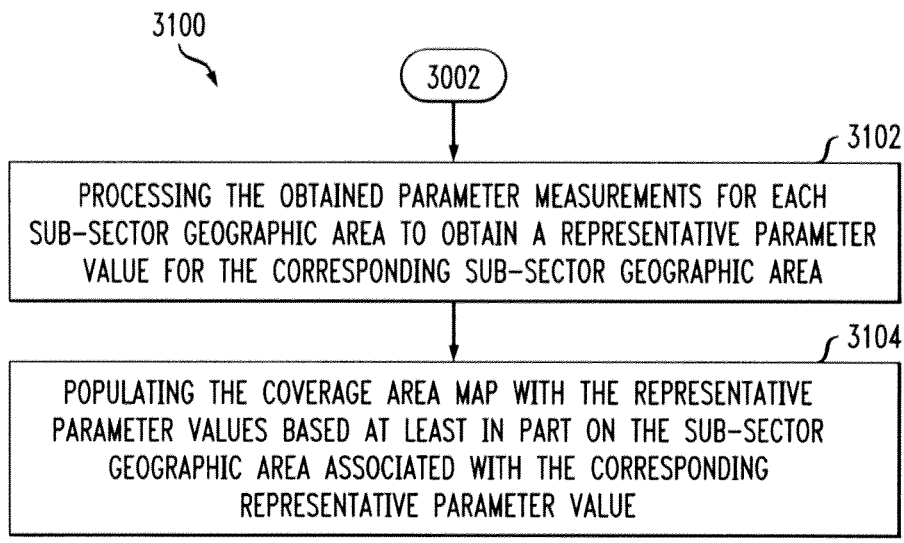
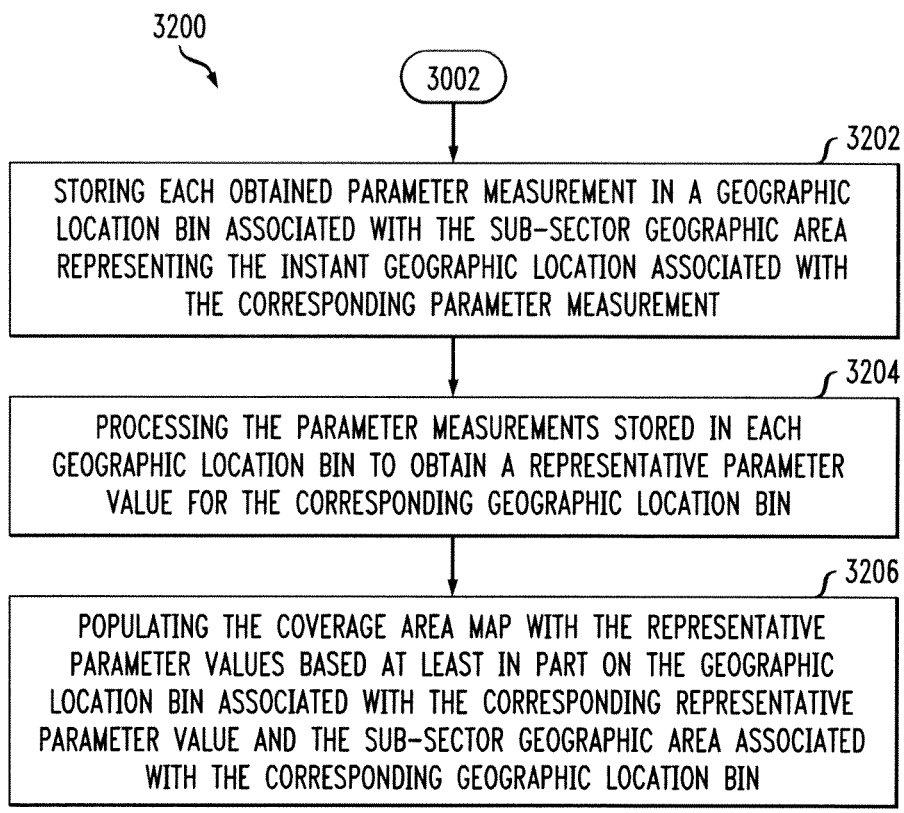

3402
OBTAINING PARAMETER MEASUREMENTS FOR A SELECT OPERATING PARAMETER ASSOCIATED WITH ONE OR MORE MOBILE STATIONS OPERATING IN AT LEAST A SELECT PORTION OF A NETWORK COVERAGE AREA FOR A WIRELESS NETWORK, THE PARAMETER MEASUREMENTS HAVING BEEN MEASURED DURING A SELECT CALENDAR TIMEFRAME, THE NETWORK COVERAGE AREA FORMED BY A PLURALITY OF BASE STATIONS, EACH BASE STATION DEFINING A CELLULAR COVERAGE AREA WITHIN THE NETWORK COVERAGE AREA, THE SELECT PORTION OF THE NETWORK COVERAGE AREA FORMED BY AT LEAST ONE BASE STATION, EACH AT LEAST ONE BASE STATION INCLUDING MULTIPLE SECTOR ANTENNAS, EACH SECTOR ANTENNA DEFINING A SECTOR COVERAGE AREA WITHIN THE CELLULAR COVERAGE AREA FOR THE CORRESPONDING BASE STATION

3404
FOR EACH OBTAINED PARAMETER MEASUREMENT, ESTIMATING AN INSTANT GEOGRAPHIC LOCATION OF THE CORRESPONDING MOBILE STATION IN RELATION TO THE AT LEAST ONE BASE STATION SERVING THE CORRESPONDING MOBILE STATION, EACH INSTANT GEOGRAPHIC LOCATION BASED AT LEAST IN PART ON A ROUND TRIP MEASUREMENT AND AT LEAST ONE SIGNAL STRENGTH MEASUREMENT ASSOCIATED WITH THE CORRESPONDING MOBILE STATION, EACH ROUND TRIP MEASUREMENT ASSOCIATED WITH THE AT LEAST ONE BASE STATION SERVING THE CORRESPONDING MOBILE STATION, EACH ROUND TRIP MEASUREMENT AND CORRESPONDING AT LEAST ONE SIGNAL STRENGTH MEASUREMENT RELATED IN CALENDAR TIME TO THE CORRESPONDING PARAMETER MEASUREMENT

3406
PROCESSING THE OBTAINED PARAMETER MEASUREMENTS FOR EACH INSTANT GEOGRAPHIC LOCATION TO OBTAIN A REPRESENTATIVE PARAMETER VALUE FOR THE CORRESPONDING INSTANT GEOGRAPHIC LOCATION

3408
POPULATING A COVERAGE AREA MAP FOR THE WIRELESS NETWORK WITH THE REPRESENTATIVE PARAMETER VALUES BASED AT LEAST IN PART ON THE INSTANT GEOGRAPHIC LOCATION ASSOCIATED WITH THE CORRESPONDING REPRESENTATIVE PARAMETER VALUE, THE COVERAGE AREA MAP INCLUDING AT LEAST THE SELECT PORTION OF THE NETWORK COVERAGE AREA

METHOD AND APPARATUS FOR MAPPING OPERATING PARAMETER IN COVERAGE AREA OF WIRELESS NETWORK

BACKGROUND

This disclosure relates to providing wireless service to a mobile station in a wireless network and more particularly, but not exclusively, to mapping an operating parameter in a coverage area of a wireless network.

Geographic location information for mobile stations has tremendous value to mobile applications, network optimization (e.g., self optimized network (SON)), capacity management, and drive test substitutions, etc. Although many modern mobile stations can obtain their own locations from integrated GPS modules, it is still a challenge for the network to track the locations of a large number of subscribers for an extended period of time. A frequent location update from mobile stations would increase network overhead and may overwhelm the network and create bottlenecks. A passive location estimation technique that leverages measurements from normal network operation is desirable because it avoids such increases in network overhead.

For example, in third generation (3G) code division multiple access (CDMA) networks, such as 3G1X, EVDO, UMTS, etc., one can triangulate the geographic location of a mobile station from the reported round trip delays between the mobile station and three or more base stations (see FIG. 1). The corresponding round trip delays are sent back by the mobile stations for call processing, thus no additional signaling overhead is incurred by the network to collect measurements for triangulation.

However, this triangulation approach does not work in all networks, such as the fourth generation (4G) long term evolution (LTE) networks. Unlike 3G CDMA networks, each measurement report in LTE networks only contains the round trip delay from one cell (i.e., the serving cell of the mobile). Thus, the triangulation technique cannot be used at all in conjunction with 4G LTE networks.

Additionally, geographic location information for mobile stations has tremendous value in compilation and formulation of RF coverage maps for wireless networks. RF coverage maps are useful for management of the network infrastructure and the wireless services provided to users and subscribers. For example, RF coverage maps may be useful to network operators and service providers for troubleshooting and planning for maintenance and upgrades.

However, most of the RF coverage maps are obtained through drive tests. Accurate RF coverage map take hours of drive tests and are very costly. Moreover, as network evolve and environment changes, such as adding new cells or new building construction, the drive tests have to be redone to keep the coverage information up to date. Thus, maintenance of RF coverage maps using drive testing adds even more to the cost.

For these and other reasons, there is a need to provide a technique for estimating a geographic location of a mobile station for at least 4G LTE networks. Additionally, it is desirable that the technique be compatible with other types of wireless networks, especially 3G CDMA networks. It is also desirable that the technique be more reliable than the triangulation technique. Additionally, it is desirable that the technique for estimating a geographic location of a mobile station support construction or maintenance of RF coverage maps in a more cost effective manner than the drive testing technique. It is also desirable to map other types of parameters collected in conjunction with normal operation of the wireless network in coverage area maps.

SUMMARY

In one aspect, a method for mapping an operating parameter in a coverage area of a wireless network is provided. In one embodiment, the method includes: obtaining parameter measurements for a select operating parameter associated with one or more mobile stations operating in at least a select portion of a network coverage area for a wireless network, the parameter measurements having been measured during a select calendar timeframe, the network coverage area formed by a plurality of base stations, each base station defining a cellular coverage area within the network coverage area, the select portion of the network coverage area formed by at least one base station, each at least one base station including multiple sector antennas, each sector antenna defining a sector coverage area within the cellular coverage area for the corresponding base station; and for each obtained parameter measurement, estimating an instant geographic location of the corresponding mobile station in relation to the at least one base station serving the corresponding mobile station, each instant geographic location based at least in part on a round trip measurement and at least one signal strength measurement associated with the corresponding mobile station, each round trip measurement associated with the at least one base station serving the corresponding mobile station, each round trip measurement and corresponding at least one signal strength measurement related in calendar time to the corresponding parameter measurement.

In another aspect an apparatus for mapping an operating parameter in a coverage area of a wireless network is provided. In one embodiment, the method includes: an input module and a location module. The input module for obtaining parameter measurements for a select operating parameter associated with one or more mobile stations operating in at least a select portion of a network coverage area for a wireless network. The parameter measurements having been measured during a select calendar timeframe. The network coverage area formed by a plurality of base stations. Each base station defining a cellular coverage area within the network coverage area. The select portion of the network coverage area formed by at least one base station. Each at least one base station including multiple sector antennas. Each sector antenna defining a sector coverage area within the cellular coverage area for the corresponding base station. The location module in operative communication with the input module for estimating an instant geographic location of the corresponding mobile station for each obtained parameter measurement in relation to the at least one base station serving the corresponding mobile station. Each instant geographic location based at least in part on a round trip measurement and at least one signal strength measurement associated with the corresponding mobile station. Each round trip measurement associated with the at least one base station serving the corresponding mobile station. Each round trip measurement and corresponding at least one signal strength measurement related in calendar time to the corresponding parameter measurement.

In yet another aspect, a non-transitory computer-readable medium storing program instructions that, when executed by a computer, cause a corresponding computer-controlled device to perform a method for mapping an operating parameter in a coverage area of a wireless network. In one embodiment of the non-transitory computer-readable medium, the method includes: obtaining parameter measurements for a select operating parameter associated with one or more mobile stations operating in at least a select portion of a network coverage area for a wireless network, the parameter measurements having been measured during a select calendar timeframe, the network coverage area formed by a plurality of base stations, each base station defining a cellular coverage area within the network coverage area, the select portion of the network coverage area formed by at least one base station, each at least one base station including multiple sector antennas, each sector antenna defining a sector coverage area within the cellular coverage area for the corresponding base station; and for each obtained parameter measurement, estimating an instant geographic location of the corresponding mobile station in relation to the at least one base station serving the corresponding mobile station, each instant geographic location based at least in part on a round trip measurement and at least one signal strength measurement associated with the corresponding mobile station, each round trip measurement associated with the at least one base station serving the corresponding mobile station, each round trip measurement and corresponding at least one signal strength measurement related in calendar time to the corresponding parameter measurement.

Further scope of the applicability of this the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 4 is a flow chart of an exemplary embodiment of a process for estimating a geographic location of a mobile station within a coverage area of a wireless network;

FIG. 5, in combination with FIG. 4, is a flow chart of another exemplary embodiment of a process for estimating a geographic location of a mobile station within a coverage area of a wireless network;

FIG. 9 is a block diagram of an exemplary embodiment of an angular position module associated with the apparatus shown in FIGS. 6-8;

FIG. 10 is a flow chart of an exemplary embodiment of a process for estimating a geographic location of a mobile station within a coverage area of a wireless network performed by a computer-controlled device executing program instructions stored on a non-transitory computer-readable medium;

FIG. 17 is a flow chart of an exemplary embodiment of a process for estimating a geographic location of a mobile station within a coverage area of a wireless network;

FIG. 18, in combination with FIG. 17, is a flow chart of another exemplary embodiment of a process for estimating a geographic location of a mobile station within a coverage area of a wireless network;

FIG. 19, in combination with FIG. 17, is a flow chart of yet another exemplary embodiment of a process for estimating a geographic location of a mobile station within a coverage area of a wireless network;

FIG. 20 is a flow chart of still another exemplary embodiment of a process for estimating a geographic location of a mobile station within a coverage area of a wireless network;

FIG. 27 is an exemplary set of population maps showing a map for all active devices in the cluster of cellular coverage areas and maps for certain types of devices during a 1-hour sample of active devices;

FIG. 28 is a flow chart of an exemplary embodiment of a process for mapping an operating parameter in a coverage area of a wireless network;

FIG. 31, in combination with FIGS. 28 and 30, is a flow chart of a further exemplary embodiment of a process for mapping an operating parameter in a coverage area of a wireless network;

FIG. 32, in combination with FIGS. 28 and 30, is a flow chart of another further exemplary embodiment of a process for mapping an operating parameter in a coverage area of a wireless network;

FIG. 34 is a flow chart of an exemplary embodiment of a process for mapping an operating parameter in a coverage area of a wireless network performed by a computer-controlled device executing program instructions stored on a non-transitory computer-readable medium.

DETAILED DESCRIPTION

Figure 1:
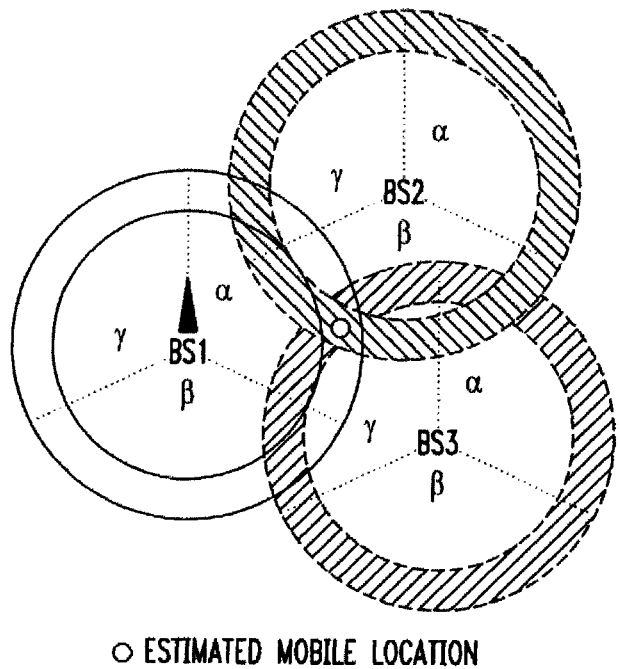
FIG. 1 is a functional diagram showing three cells of a wireless network in relation to an exemplary embodiment of a triangulation technique for estimating the geographic location of a mobile station.

Various embodiments of methods and apparatus provide techniques for mapping an operating parameter in a coverage area of a wireless network. In one embodiment, parameter measurements associated with operation of a mobile station in a coverage area of a base station having multiple sector antennas are obtained for a select operating parameter, obtaining a round trip measurement and at least one signal strength measurement associated with the mobile station, estimating the instant geographic location of the mobile station based at least in part on the round trip measurement and the at least one signal strength measurement to relate instant geographic locations with each parameter measurement. Various techniques for processing and mapping the parameter measurements in coverage area maps based at least in part on the estimated geographic locations are also presented. For example, any suitable operating parameter that is measured in conjunction normal operations of mobile stations in the wireless network can be mapped, such as signal strength measurements in RF coverage maps, data or signaling usage for communication sessions in usage maps, device or application usage in population maps, and throughput, packet loss, or packet delay in quality of service maps. The various embodiments described herein provide improved accuracy of information in location estimates for mobile stations by combining measurements for both the distance and signaling strength/quality reports in the algorithm for estimating the location.

The estimating of the geographic location of mobile stations in conjunction with mapping parameter measurements can be accomplished using any of the various embodiments of methods and apparatus for estimating a geographic location of a mobile station described below in the descriptions of FIGS. 1-27. Depending on the operating parameter, maps can be generated to indicate network performance, coverage, usage, and end user experience or activities. The maps are generated based on real user information. Actual users can be indoors or outdoors, can be in fast moving vehicle or stationary. Conversely, for measurements obtained from drive test data, the drive test device is normally in a moving vehicle in an outdoor environment to which the vehicle has access. Metrics of interest, such as coverage, usage, user experience and activities, etc can be tracked for all active users during any select calendar time. In fact, tracking could be continuous using a rolling time window. Limitations on calendar time for tracking or the size of the rolling time window may arise if limitations on storage capacity are encountered. On the other hand, drive test data can only be collected in conjunction with scheduled drive tests that are usually set up for a certain time of the day and is one time event. Drive test data cannot reflect network operation conditions 24 hours a day, seven days a week.

The various embodiments of methods and apparatus for estimating a geographic location of a mobile station described below in the descriptions of FIGS. 1-27 can be used to estimate the geographic location of mobile stations in conjunction with the measurement of operating parameters to be mapped. The operating parameters can be selected so that the maps indicate network performance, coverage, usage and end user experience. These maps can be used for optimizing the wireless network (SON), troubleshooting, network planning, etc.

The various types of coverage area maps include RF coverage maps, usage maps, population maps, user experience maps, and user profile maps. RF coverage maps can provide RF coverage map for a given cell, a given sector of a cell, or a cluster of cells. If multiple sector antennas of a base station cover a given sub-sector area of the map, the sector antenna providing the strongest coverage may be mapped. RF coverage maps that show call drop locations and handoff zones can be generated.

Usage maps can be generated for all active devices or by device type, device model, and software application in various combinations. Usage maps can show data usage or signaling usage for communication sessions. Population maps can also be generated for all active devices or by device type, device model, or software applications in various combinations. For example, population maps plot the number of active devices for a given device model, such as the number of iPhones active in a 50 meter by 50 meter sub-sector geographic area (i.e., geo-bin area). User experience maps can be generated for all active devices or by device type, device model, or software application in various combinations. User experience maps plot metrics (i.e., parameter measurements) reflecting quality of service, such as throughput, packet loss, or packet delay. For example, a throughput map for a YouTube software application or a packet loss map for a Blackberry device. User profile maps may be generated per geographic location or geographic area. For example, user profile maps can show software applications used, web sites visited, etc.

Figure 23:
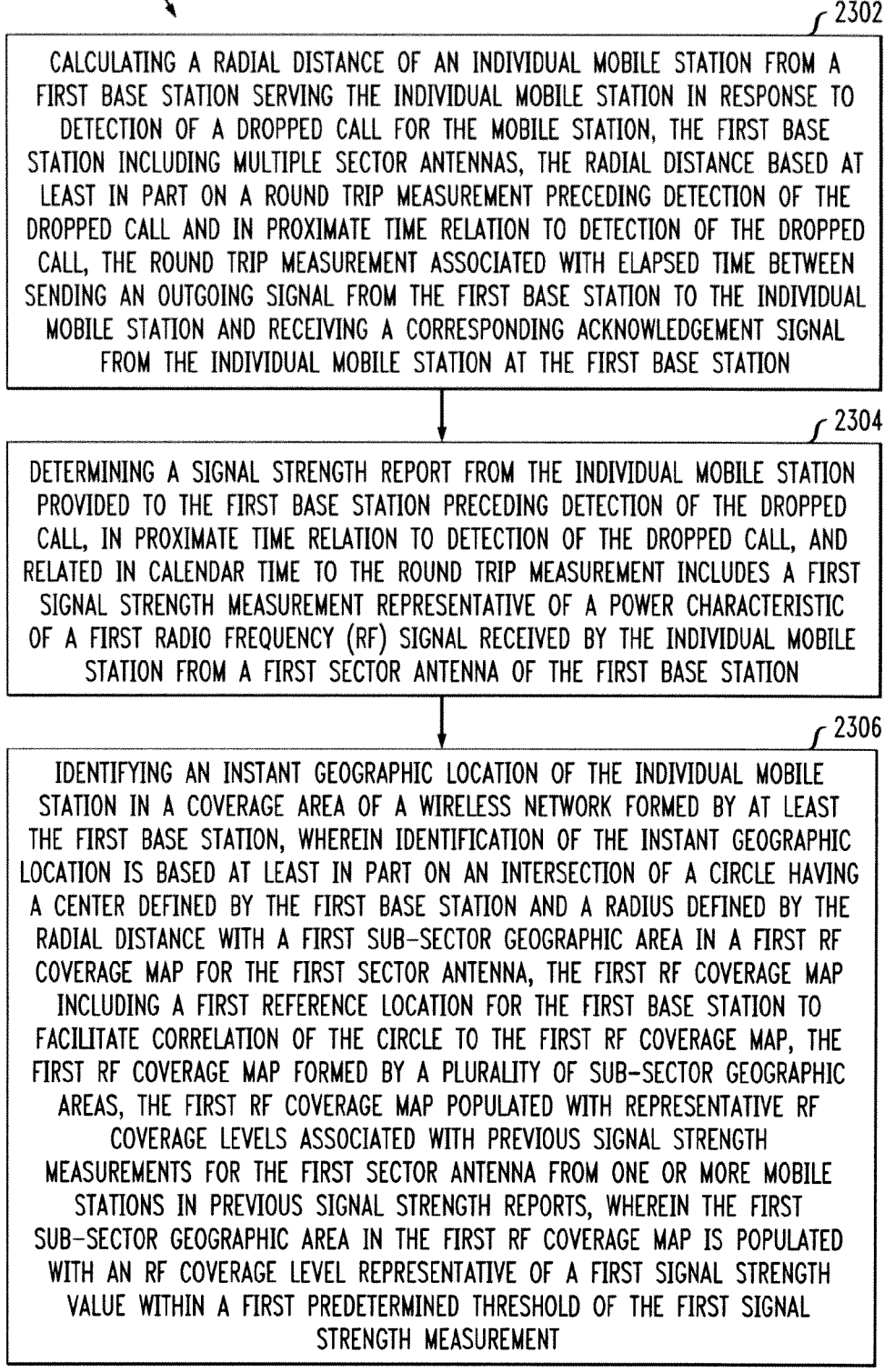
FIG. 23 is a flow chart of yet another exemplary embodiment of a process for estimating a geographic location of a mobile station within a coverage area of a wireless network.
Figure 24:
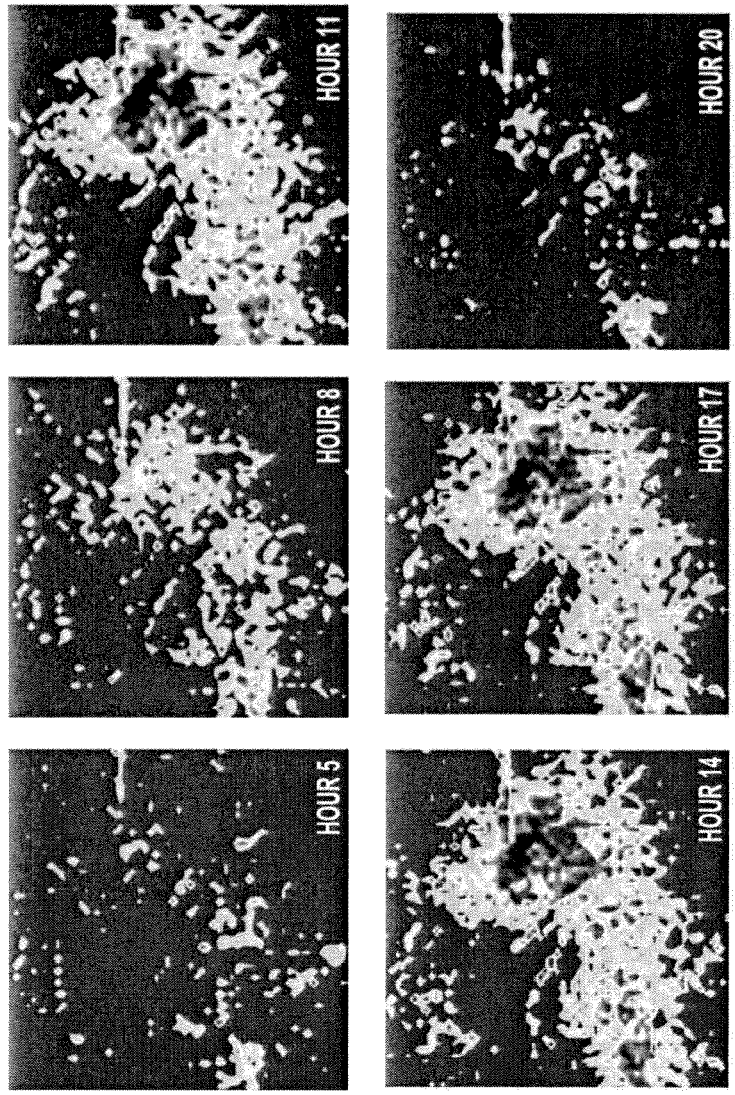
FIG. 24 is an exemplary set of signaling usage maps for a cluster of cellular coverage areas for a wireless network showing six 1-hour samples of signaling usage over a 24-hour period.

With reference to FIG. 24, an exemplary set of signaling usage maps for a cluster of cellular coverage areas for a wireless network shows six 1-hour samples of signaling usage over a 24-hour period. An exemplary embodiment of a process for generating data usage maps during different hours of the day includes dividing an area of interest into sub-sector geographic areas (i.e., geo-bins). For example, a geo-bin size can represent a 50 meter by 50 meter sub-sector geographic area within the coverage area of a wireless network or a portion thereof. For a given call record during the given hour, the process includes estimating the mobile station location by using any suitable embodiment of the network-based geo-location method discussed below in the descriptions of FIGS. 1-27. The mapping process also includes extracting data usage information from the call record and storing the usage amount in the corresponding geo-bin for the given hour. The data usage information in the geo-bin can be processed to determine a representative usage value to be mapped in the sub-sector geographic area of the coverage area map.

Figure 25:
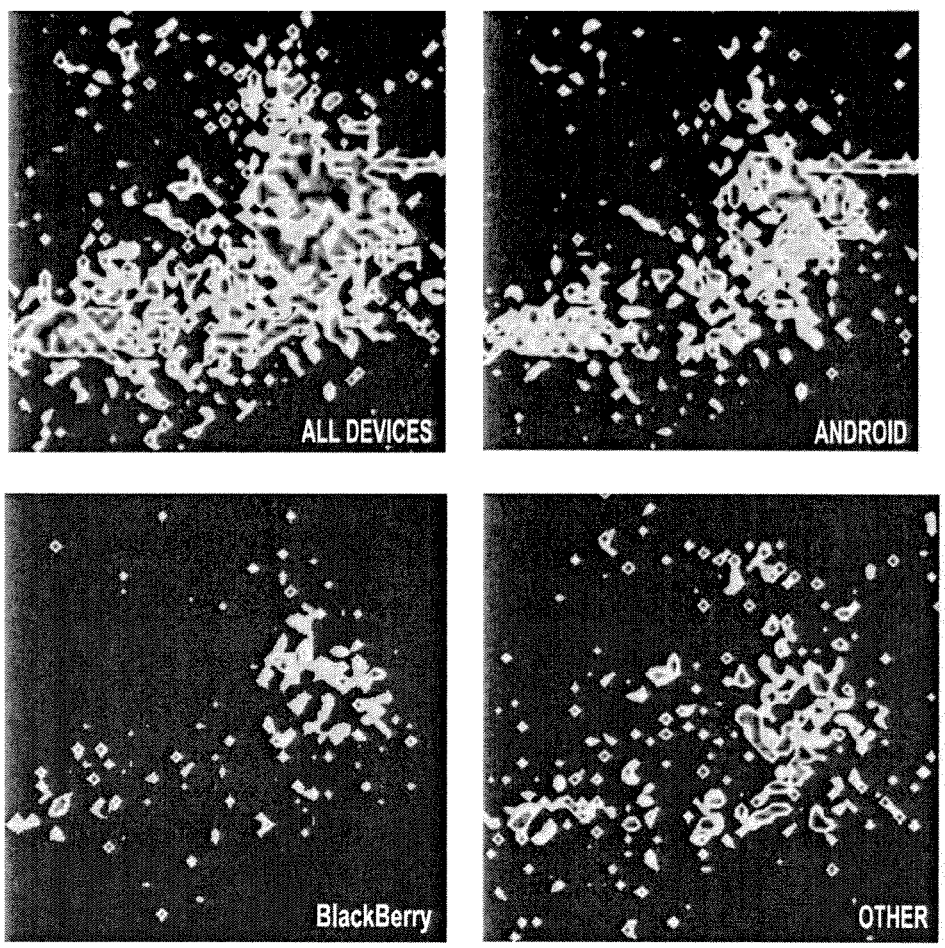
FIG. 25 is an exemplary set of data usage maps showing a map for all devices in the cluster of cellular coverage areas and maps for certain types of devices during a 1-hour sample of data usage.
Figure 26:
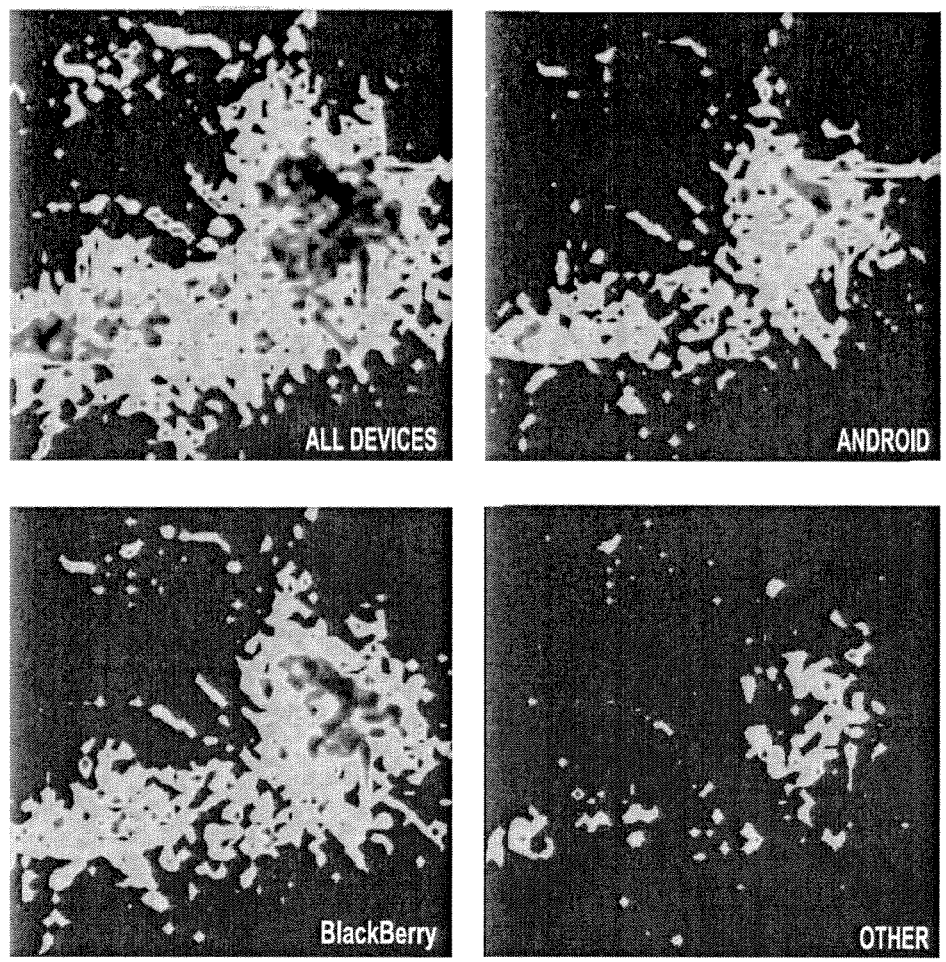
FIG. 26 is an exemplary set of signaling usage maps showing a map for all devices in the cluster of cellular coverage areas and maps for certain types of devices during a 1-hour sample of signaling usage.

With reference to FIG. 25, an exemplary set of data usage maps shows a map for all devices in the cluster of cellular coverage areas and maps for certain types of devices during a 1-hour sample of data usage. Similarly, FIG. 26 shows an exemplary set of signaling usage maps, including a map for all devices in the cluster of cellular coverage areas and maps for certain types of devices during a 1-hour sample of signaling usage. FIG. 27 shows an exemplary set of population maps, including a map for all active devices in the cluster of cellular coverage areas and maps for certain types of devices during a 1-hour sample of active devices.

With reference to FIG. 28, an exemplary embodiment of a process 2800 for mapping an operating parameter in a coverage area of a wireless network begins at 2802 where parameter measurements for a select operating parameter associated with one or more mobile stations operating in at least a select portion of a network coverage area for a wireless network are obtained. The parameter measurements having been measured during a select calendar timeframe. The network coverage area formed by a plurality of base stations. Each base station defining a cellular coverage area within the network coverage area. The select portion of the network coverage area formed by at least one base station. Each at least one base station including multiple sector antennas. Each sector antenna defining a sector coverage area within the cellular coverage area for the corresponding base station. At 2804, for each obtained parameter measurement, an instant geographic location of the corresponding mobile station is estimated in relation to the at least one base station serving the corresponding mobile station. Each instant geographic location based at least in part on a round trip measurement and at least one signal strength measurement associated with the corresponding mobile station. Each round trip measurement associated with the at least one base station serving the corresponding mobile station. Each round trip measurement and corresponding at least one signal strength measurement related in calendar time to the corresponding parameter measurement.

Figure 29:
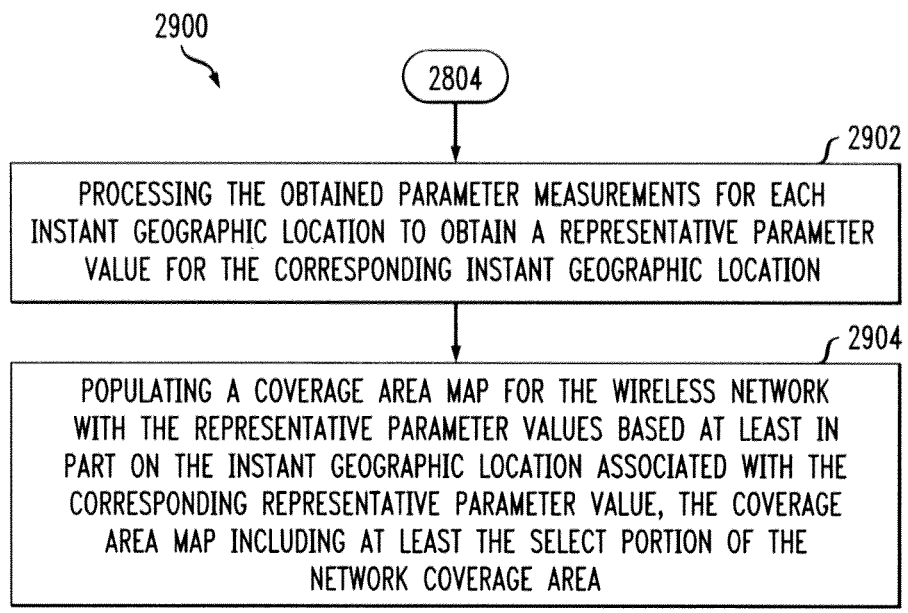
FIG. 29, in combination with FIG. 28, is a flow chart of another exemplary embodiment of a process for mapping an operating parameter in a coverage area of a wireless network.

With reference to FIGS. 28 and 29, another exemplary embodiment of a process 2900 for mapping an operating parameter in a coverage area of a wireless network includes the process 2800 of FIG. 28 and continues with 2902 where obtained parameter measurements for each instant geographic location are processed to obtain a representative parameter value for the corresponding instant geographic location. At 2904, a coverage area map for the wireless network is populated with the representative parameter values based at least in part on the instant geographic location associated with the corresponding representative parameter value. The coverage area map including at least the select portion of the network coverage area.

In another embodiment of the process 2900, the representative parameter values are obtained by filtering the corresponding parameter measurements to remove unreliable measurements, averaging the corresponding parameter measurements, determining a median value for the corresponding parameter measurements, selecting a preferred parameter measurement from the corresponding parameter measurements based at least in part on a preferred calendar time for the corresponding representative parameter value, any other suitable processing technique, or any suitable combination thereof.

In yet another embodiment of the process 2900, the coverage area map is an RF coverage area map, a handoff zone coverage area map, a data usage coverage area map, a signaling usage coverage area map, a population coverage area map for directory number identification, device identification, device type, or application program, a quality of service coverage area map for throughput, packet loss, or packet delay, a user profile coverage area map, any other suitable coverage area map, or any suitable combination thereof.

Figure 30:
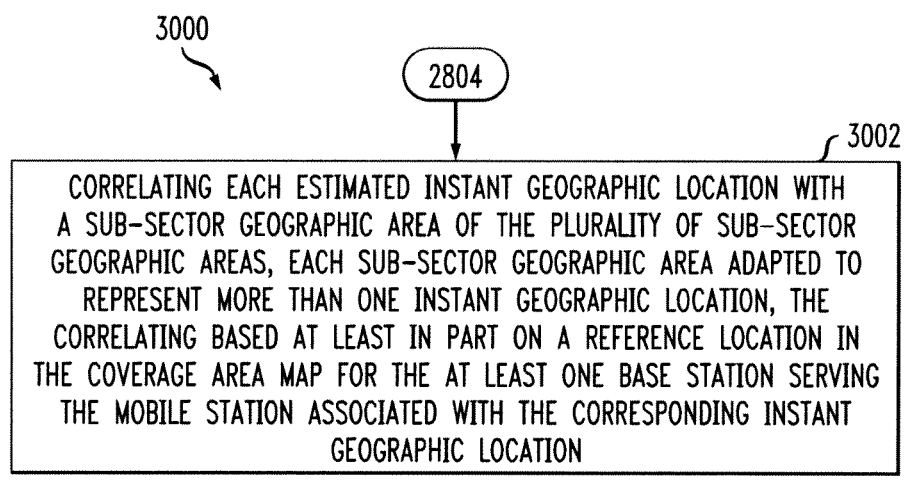
FIG. 30, in combination with FIG. 28, is a flow chart of yet another exemplary embodiment of a process for mapping an operating parameter in a coverage area of a wireless network.

With reference to FIGS. 28 and 30, yet another exemplary embodiment of a process 3000 for mapping an operating parameter in a coverage area of a wireless network includes the process 2800 of FIG. 28. In this embodiment, at least the select portion of the network coverage area is represented in a coverage area map for the wireless network by a plurality of sub-sector geographic areas. Each sub-sector geographic area uniquely identified and associated with at least a portion of the sector coverage area for at least one sector antenna. At 3002, each estimated instant geographic location is correlated with a sub-sector geographic area of the plurality of sub-sector geographic areas. Each sub-sector geographic area adapted to represent more than one instant geographic location. The correlating based at least in part on a reference location in the coverage area map for the at least one base station serving the mobile station associated with the corresponding instant geographic location.

With reference to FIGS. 28, 30, and 31, a further exemplary embodiment of a process 3100 for mapping an operating parameter in a coverage area of a wireless network includes the processes 2800, 3000 of FIGS. 28 and 30 and continues with 3102 where obtained parameter measurements for each sub-sector geographic area are processed to obtain a representative parameter value for the corresponding sub-sector geographic area. At 3104, the coverage area map is populated with the representative parameter values based at least in part on the sub-sector geographic area associated with the corresponding representative parameter value.

With reference to FIGS. 28, 30, and 32, another further exemplary embodiment of a process 3200 for mapping an operating parameter in a coverage area of a wireless network includes the processes 2800, 3000 of FIGS. 28 and 30. In this embodiment, each sub-sector geographic area is associated with a corresponding geographic location bin for storage of parameter measurements associated with the instant geographic locations represented by the corresponding sub-sector geographic. At 3202, each obtained parameter measurement is stored in a geographic location bin associated with the sub-sector geographic area representing the instant geographic location associated with the corresponding parameter measurement. Next, the parameter measurements stored in each geographic location bin is processed to obtain a representative parameter value for the corresponding geographic location bin (3204). At 3206, the coverage area map is populated with the representative parameter values based at least in part on the geographic location bin associated with the corresponding representative parameter value and the sub-sector geographic area associated with the corresponding geographic location bin.

With reference again to FIG. 28, in another embodiment of the process 2800, the parameter measurements are obtained from call records, subscriber records, service provider records, other suitable types of wireless data records, or any suitable combination thereof. The records may include data that is captured and/or maintained during normal operation of the wireless network that provide wireless services to mobile stations. The records may also include data that supports accounting and billing functions for the service provider.

In yet another embodiment of the process 2800, the select operating parameter includes one or more of a signal strength parameter associated with RF signals received by mobile stations from sector antennas, a handoff parameter associated with handoffs of mobile stations from serving sector antennas to neighboring sector antennas of serving base stations or neighboring base stations, a data usage parameter associated with data usage during call sessions to and from mobile stations, a signaling usage parameter associated with setup and teardown of call sessions to and from mobile stations, a directory number identification parameter associated with telephone numbers for mobile stations, a device identification parameter associated with serial numbers of mobile stations, a device type parameter associated with categorizing mobile stations into different types by manufacturer, model, or technical feature, an application identification parameter associated with application programs used by mobile stations, a throughput parameter associated with call sessions for mobile stations, a packet loss parameter associated with call sessions for mobile stations, a packet delay parameter associated with call sessions for mobile stations, a user profile parameter associated with observed behavior or preferences of users of mobile stations, or any other suitable operating parameter.

In still another embodiment of the process 2800, the select portion of the network coverage area is formed by at least two base stations. In the embodiment being described, each at least two base stations including multiple sector antennas. In still yet another embodiment of the process 2800, at least some instant geographic locations are based at least in part on the round trip measurement and first and second signal strength measurements of the at least one signal strength measurement. In this embodiment, the first and second signal strength measurements being from different sector antennas.

In another embodiment of the process 2800, at least some instant geographic locations are based at least in part on the round trip measurement, a first signal strength measurement of the at least one signal strength measurement, and a first RF coverage map for a first sector antenna serving the mobile station associated with the round trip measurement and with which the first signal strength measurement is associated. In a further embodiment of the process 2800, one or more instant geographic locations are also based at least in part on a second signal strength measurement of the at least one signal strength measurement and a second RF coverage map for a second sector antenna with which the second signal strength measurement is associated, the second sector antenna associated with a neighboring base station in relation to the base station serving the mobile station.

In yet another embodiment of the process 2800, parameter measurements are obtained and the instant geographic locations are estimated in response to detection of a dropped call for the one or more mobile stations.

Figure 33:
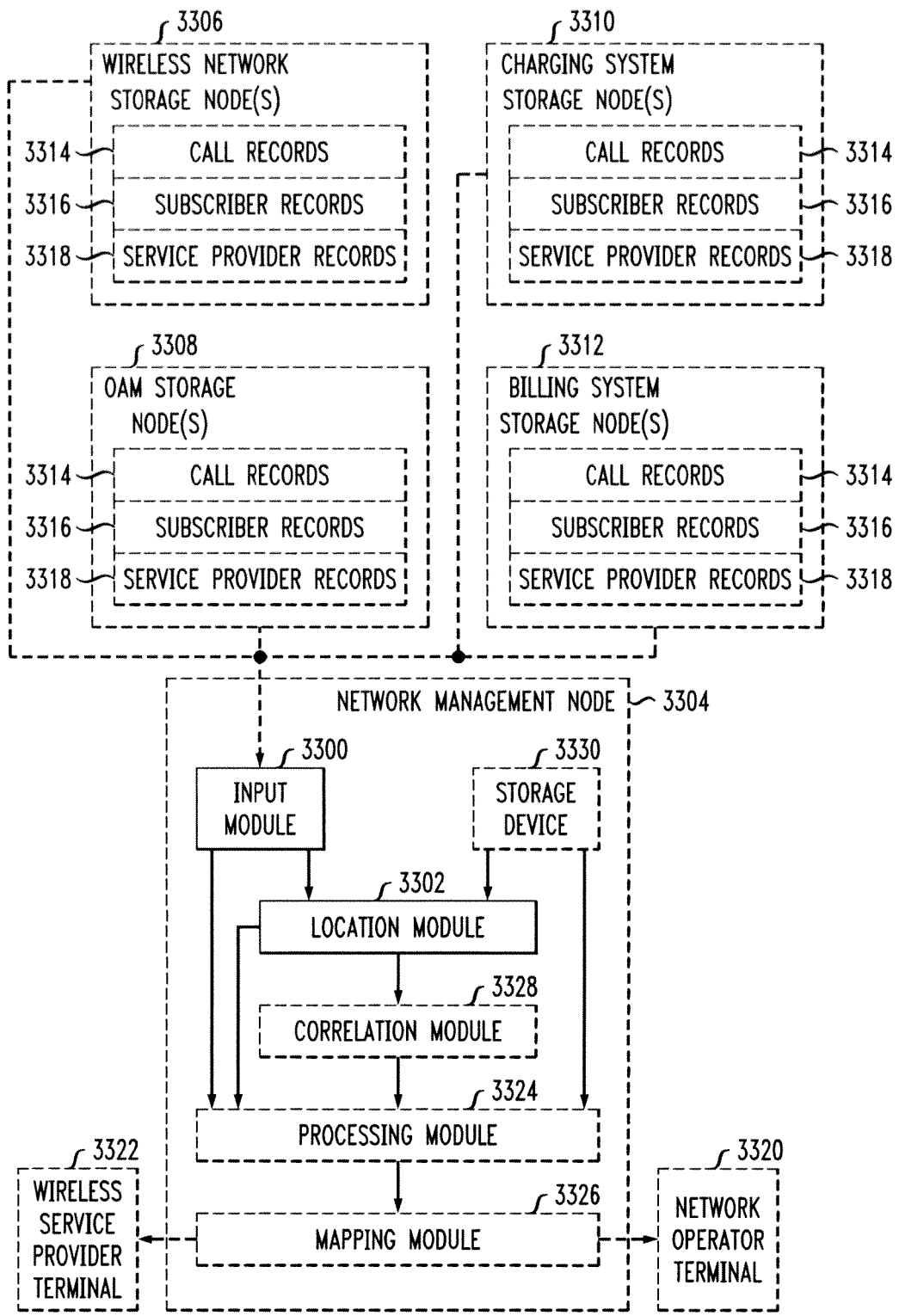
FIG. 33 is a block diagram of an exemplary embodiment of an apparatus within a network management node associated with a wireless network for mapping an operating parameter in a coverage area of the wireless network.

With reference to FIG. 33, an exemplary embodiment of an apparatus for mapping an operating parameter in a coverage area of the wireless network includes an input module 3300 and a location module 3302. The input module 3300 for obtaining parameter measurements for a select operating parameter associated with one or more mobile stations operating in at least a select portion of a network coverage area for a wireless network. The input module 3300 may obtain the parameter measurements from the components of the wireless network, an operation and maintenance (OAM) system, a charging system, a billing system, or any suitable combination thereof. The parameter measurements having been measured during a select calendar timeframe. The network coverage area formed by a plurality of base stations. Each base station defining a cellular coverage area within the network coverage area. The select portion of the network coverage area formed by at least one base station. Each at least one base station including multiple sector antennas. Each sector antenna defining a sector coverage area within the cellular coverage area for the corresponding base station.

The location module 3302 in operative communication with the input module 3300 for estimating an instant geographic location of the corresponding mobile station for each obtained parameter measurement in relation to the at least one base station serving the corresponding mobile station. Each instant geographic location based at least in part on a round trip measurement and at least one signal strength measurement associated with the corresponding mobile station. The round trip and the at least one signal strength measurement obtained via the input module 3300. The input module 3300 may obtain the round trip measurements and signal strength measurements from the components of the wireless network, OAM system, charging system, billing system, or any suitable combination thereof. Each round trip measurement associated with the at least one base station serving the corresponding mobile station, each round trip measurement and corresponding at least one signal strength measurement related in calendar time to the corresponding parameter measurement.

In the embodiment being described, the apparatus may include a network management node 3304 associated with the wireless network and in operative communication with wireless network storage node(s) 3306, OAM storage node(s) 3308, charging system storage node(s) 3310, and billing system storage nodes(s) 3312 to obtain parameter measurements for operating parameters associated with mobile stations, including round trip measurements and signal strength measurements from call records 3314, subscriber records 3316, service provider records 3318, or any suitable combination thereof. The network management node 3304 is in operative communication with a network operator terminal 3320 to facilitate management of the infrastructure for the core wireless network by the network operator. The network management node 3304 is also in operative communication with a wireless service provider terminal 3322 to facilitate management of a service provided to subscribers via the core wireless network by the provider of the wireless service.

In another embodiment, the network management node 3304 may also include a processing module 3324 and a mapping module 3326. The processing module 3324 in operative communication with the input module 3300 and location module 3302 for processing the obtained parameter measurements for each instant geographic location to obtain a representative parameter value for the corresponding instant geographic location. The mapping module 3326 in operative communication with the processing module 3324 for populating a coverage area map for the wireless network with the representative parameter values based at least in part on the instant geographic location associated with the corresponding representative parameter value, the coverage area map including at least the select portion of the network coverage area. The network management node 3304 may make coverage area maps accessible to authorized network operators via the network operator terminal 3320 and/or accessible to authorized wireless service providers via the wireless service provider terminal 3322. For example, the coverage area maps may be communicated to the network operator terminal 3320 and/or wireless service provider terminal 3322 via the mapping module 3326 in as an image of the coverage area map or as data reflecting the representative parameter values, instant geographic locations, and other map information in a form suitable for the corresponding terminal to construct the image of the coverage area map.

In a further embodiment of the network management node 3304, the processing module 3324 obtains the representative parameter values by one or more of filtering the corresponding parameter measurements to remove unreliable measurements, averaging the corresponding parameter measurements, determining a median value for the corresponding parameter measurements, selecting a preferred parameter measurement from the corresponding parameter measurements based at least in part on a preferred calendar time for the corresponding representative parameter value, any other suitable processing technique, or any suitable combination thereof.

In an alternate further embodiment of the network management node 3304, the coverage area map is an RF coverage area map, a handoff zone coverage area map, a data usage coverage area map, a signaling usage coverage area map, a population coverage area map for directory number identification, device identification, device type, or application program, a quality of service coverage area map for throughput, packet loss, or packet delay, a user profile coverage area map, any other suitable coverage area map, or any suitable combination thereof.

In yet another embodiment of the network management node 3304, at least the select portion of the network coverage area is represented in a coverage area map for the wireless network by a plurality of sub-sector geographic areas. Each sub-sector geographic area uniquely identified and associated with at least a portion of the sector coverage area for at least one sector antenna. In this embodiment, the network management node 3304 also includes a correlation module 3328 in operative communication with the location module 3302 for correlating each estimated instant geographic location with a sub-sector geographic area of the plurality of sub-sector geographic areas. Each sub-sector geographic area adapted to represent more than one instant geographic location. The correlating based at least in part on a reference location in the coverage area map for the at least one base station serving the mobile station associated with the corresponding instant geographic location.

In a further embodiment, the network management node 3304 also includes the processing module 3324 and mapping module 3326. In this embodiment, the processing module 3324 is in operative communication with the input module 3300 and correlating module 3328 for processing the obtained parameter measurements for each sub-sector geographic area to obtain a representative parameter value for the corresponding sub-sector geographic area. In the embodiment being described, the mapping module 3326 is in operative communication with the processing module 3324 for populating the coverage area map with the representative parameter values based at least in part on the sub-sector geographic area associated with the corresponding representative parameter value.

In an alternate further embodiment of the network management node 3304, each sub-sector geographic area is associated with a corresponding geographic location bin for storage of parameter measurements associated with the instant geographic locations represented by the corresponding sub-sector geographic. In this embodiment, the network management node 3304 also includes a storage device 3330, processing module 3324, and mapping module 3326. The storage device 3330 in operative communication with the input module 3300 and the location module 3302 for storing each obtained parameter measurement in a geographic location bin associated with the sub-sector geographic area representing the instant geographic location associated with the corresponding parameter measurement. The storage device 3330 also stores the round trip and signal strength measurements used by the location module 3302. In this embodiment, the processing module 3324 is in operative communication with the storage device 3330 and correlating module 3328 for processing the parameter measurements stored in each geographic location bin to obtain a representative parameter value for the corresponding geographic location bin. In the embodiment being described, the mapping module 3326 is in operative communication with the processing module 3324 for populating the coverage area map with the representative parameter values based at least in part on the geographic location bin associated with the corresponding representative parameter value and the sub-sector geographic area associated with the corresponding geographic location bin.

In still another embodiment of the network management node 3304, the input module 3300 obtains the parameter measurements from call records 3314, subscriber records 3316, and service provider records 3318 captured or maintained during normal operation of the wireless network that provide wireless services to mobile stations or that support accounting and billing functions for the service provider. The call records 3314, subscriber records 3316, and service provider records 3318 may be obtained from storage in the wireless network storage node(s) 3306, OAM storage node(s) 3308, charging system storage node(s) 3310, billing system storage node(s) 3312, or any suitable combination thereof.

In still yet another embodiment of the network management node 3304, the select operating parameter includes one or more of a signal strength parameter associated with RF signals received by mobile stations from sector antennas, a handoff parameter associated with handoffs of mobile stations from serving sector antennas to neighboring sector antennas of serving base stations or neighboring base stations, a data usage parameter associated with data usage during call sessions to and from mobile stations, a signaling usage parameter associated with setup and teardown of call sessions to and from mobile stations, a directory number identification parameter associated with telephone numbers for mobile stations, a device identification parameter associated with serial numbers of mobile stations, a device type parameter associated with categorizing mobile stations into different types by manufacturer, model, or technical feature, an application identification parameter associated with application programs used by mobile stations, a throughput parameter associated with call sessions for mobile stations, a packet loss parameter associated with call sessions for mobile stations, a packet delay parameter associated with call sessions for mobile stations, a user profile parameter associated with observed behavior or preferences of users of mobile stations, or any other suitable operating parameter.

In another embodiment of the network management node 3304, the select portion of the network coverage area is formed by at least two base stations. In the embodiment being described, each at least two base stations including multiple sector antennas. In yet another embodiment of the network management node 3304, at least some instant geographic locations estimated by the location module 3302 are based at least in part on the round trip measurement and first and second signal strength measurements of the at least one signal strength measurement. In this embodiment, the first and second signal strength measurements being from different sector antennas.

In still another embodiment of the network management node 3304, at least some instant geographic locations estimated by the location module 3302 are based at least in part on the round trip measurement, a first signal strength measurement of the at least one signal strength measurement, and a first RF coverage map for a first sector antenna serving the mobile station associated with the round trip measurement and with which the first signal strength measurement is associated. In a further embodiment of the network management node 3304, one or more instant geographic locations estimated by the location module 3302 are also based at least in part on a second signal strength measurement of the at least one signal strength measurement and a second RF coverage map for a second sector antenna with which the second signal strength measurement is associated, the second sector antenna associated with a neighboring base station in relation to the base station serving the mobile station.

In still yet another embodiment of the network management node 3304, parameter measurements are obtained by the input module 3300 and the instant geographic locations are estimated by the location module 3302 in response to detection of a dropped call for the one or more mobile stations.

With reference to FIG. 34, an exemplary embodiment of a non-transitory computer-readable medium storing program instructions that, when executed by a computer, cause a corresponding computer-controlled device to perform a process 3400 for mapping an operating parameter in a coverage area of a wireless network. In one embodiment, the process 3400 begins at 3402 wherein parameter measurements for a select operating parameter associated with one or more mobile stations operating in at least a select portion of a network coverage area for a wireless network are obtained. The parameter measurements having been measured during a select calendar timeframe. The network coverage area formed by a plurality of base stations. Each base station defining a cellular coverage area within the network coverage area. The select portion of the network coverage area formed by at least one base station. Each at least one base station including multiple sector antennas. Each sector antenna defining a sector coverage area within the cellular coverage area for the corresponding base station. At 3404, for each obtained parameter measurement, an instant geographic location of the corresponding mobile station is estimated in relation to the at least one base station serving the corresponding mobile station. Each instant geographic location based at least in part on a round trip measurement and at least one signal strength measurement associated with the corresponding mobile station. Each round trip measurement associated with the at least one base station serving the corresponding mobile station. Each round trip measurement and corresponding at least one signal strength measurement related in calendar time to the corresponding parameter measurement.

In another embodiment, the process 3400 may also include processing the obtained parameter measurements for each instant geographic location to obtain a representative parameter value for the corresponding instant geographic location. In this embodiment, a coverage area map for the wireless network is populated with the representative parameter values based at least in part on the instant geographic location associated with the corresponding representative parameter value. In the embodiment being described, the coverage area map includes at least the select portion of the network coverage area.

In various embodiments, the program instructions stored in the non-transitory computer-readable memory, when executed by the computer, may cause the computer-controlled device to perform various combinations of functions associated with the various embodiments of the processes 2800, 2900, 3000, 3100, and 3200 for mapping an operating parameter in a coverage area of a wireless network described above with reference to FIGS. 28-32. In other words, the various embodiments of the processes 2800, 2900, 3000, 3100, and 3200 described above may also be implemented by corresponding embodiments of the process 3400 associated with the program instructions stored in the non-transitory computer-readable memory.

Similarly, the program instructions stored in the non-transitory computer-readable memory, when executed by the computer, may cause the computer-controlled device to perform various combinations of functions associated with the various embodiments of the processes for estimating a geographic location of a mobile station 400, 500, 1700, 1800, 1900, 2000, 2100, 2200, and 2300 (see FIGS. 4, 5, and 17-23) in conjunction with estimating the instant geographic location of a mobile station in 3404. In other words, the various embodiments of the processes 400, 500, 1700, 1800, 1900, 2000, 2100, 2200, and 2300 described above may also be implemented by corresponding embodiments of the process 3400 associated with the program instructions stored in the non-transitory computer-readable memory, particularly the estimating of the instant geographic location in 3404.

Likewise, in various embodiments, the program instructions stored in the non-transitory computer-readable memory, when executed by the computer, may cause the computer-controlled device to perform various combinations of functions associated with the various embodiments of the apparatus for mapping an operating parameter in a coverage area of a wireless network described above with reference to FIG. 33, the apparatus for estimating a geographic location of a mobile station described above with reference to FIG. 8, and the angular position module 906 described above with reference to FIG. 9.

Figure 8:
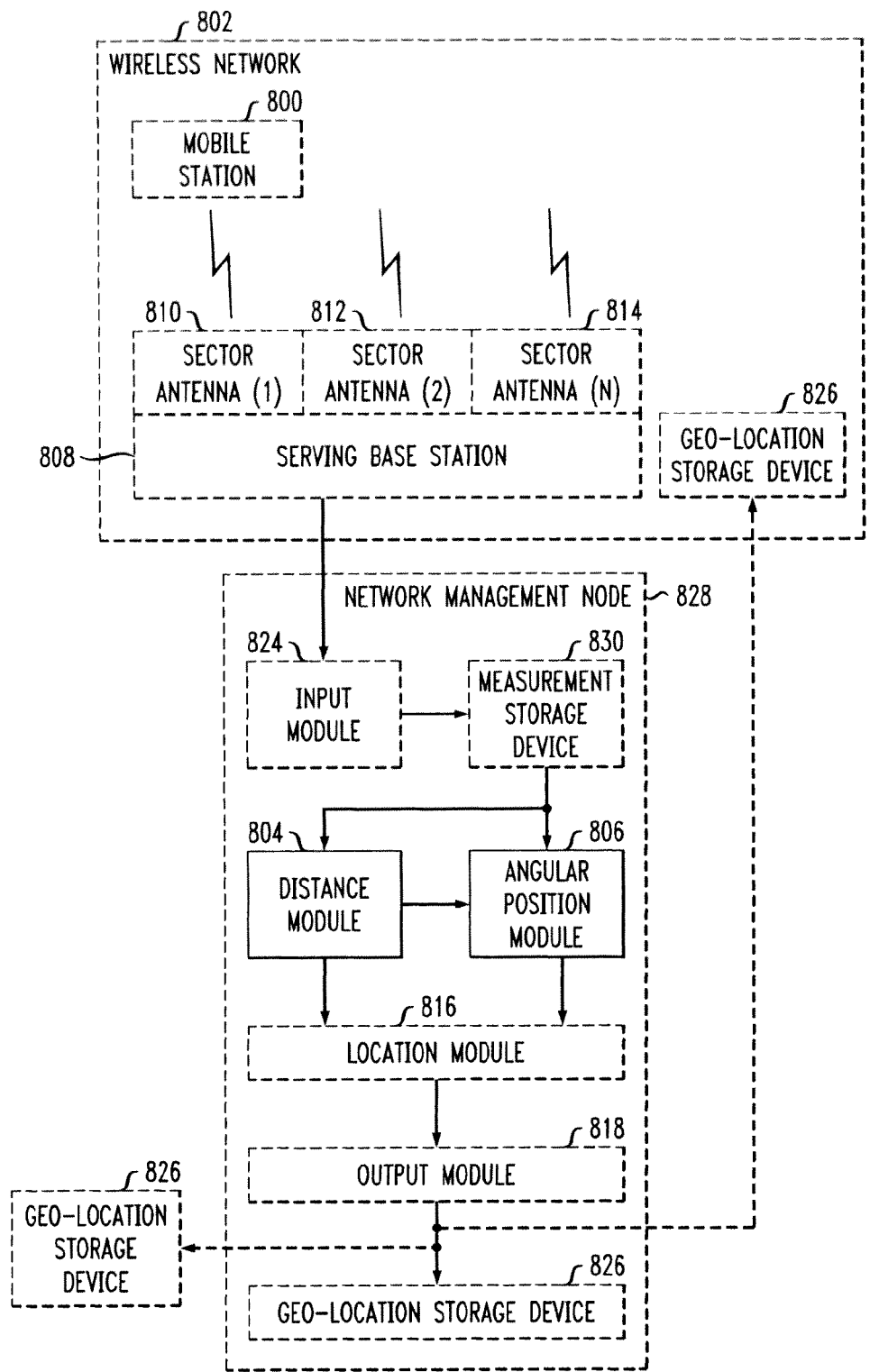
FIG. 8 is a block diagram of an exemplary embodiment of an apparatus within a network management node associated with a wireless network for estimating a geographic location of a mobile station within a coverage area of the wireless network.

For example, the computer-controlled device may include a network management node (see FIG. 33, item 3304; FIG. 8, item 828), or any suitable communication node associated with the wireless network. Any suitable module or sub-module described above with reference to FIGS. 8, 9, and 33 may include the computer and non-transitory computer-readable memory associated with the program instructions. Alternatively, the computer and non-transitory computer-readable memory associated with the program instructions may be individual or combined components that are in operative communication with any suitable combination of the modules and sub-modules described above with reference to FIGS. 8, 9, and 33.

Figure 13:
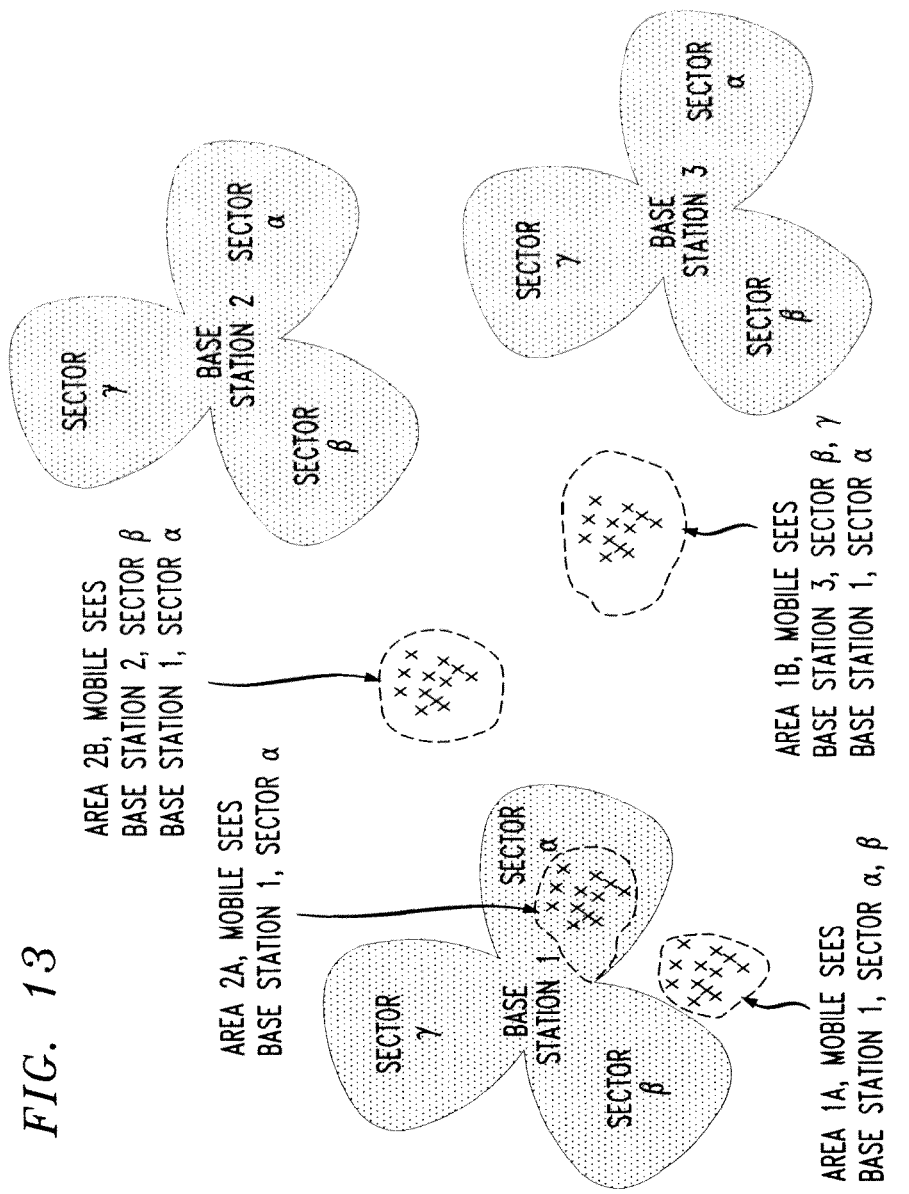
FIG. 13 is a functional diagram showing three base stations, each with three sector antennas, in relation to exemplary embodiments of various techniques for estimating the geographic location of a mobile station.

With reference to FIG. 13, a functional diagram shows three base stations, each with three sector antennas, in relation to exemplary embodiments of various techniques for estimating the geographic location of a mobile station by dividing the wireless service area into different categories of circumstances for estimating the location. Different types of data are available for the different categories. Thus, the techniques for estimating geographic location are adjusted for each category based on the type of data available under the corresponding circumstance.

In a category 1 area, mobile station locations can be determined by an algorithm that calculates an angular position of the mobile station in relation to a serving or neighboring base station using signal strength measurements from multiple sector antennas of the base station in a measurement report from the mobile station and determines a radial distance of the mobile station from the serving base station based on a round trip measurement. Various embodiments of algorithms for the category 1 area are provided below in the descriptions of FIGS. 1-12 and 17-19.

With continued reference to FIG. 13, category 2 areas are locations in which the mobile station is only receiving signal strength measurements from one sector antenna from each of one, two, or more base stations. Category 2 areas can be viewed as the rest of the coverage area for a given cell (or given sector) of the wireless network that do not fit under the category 1 circumstances. In a category 2 area, the mobile station location is determined based on the combination of determining a radial distance of the mobile station from a serving based station based on a round trip measurement and a strength measurements from one sector antenna of each of one, two, or more base stations in a measurement report from the mobile station to identify potential sub-sector geographic coverage areas in an RF coverage map for a serving sector antenna of the serving base station populated with an RF coverage level representative of lacking previous signal strength measurements, and using RF coverage levels in the RF coverage map for neighboring sub-sector geographic coverage areas to estimate the geographic location of the mobile station. Various embodiments of algorithms for the category 1 area are provided below in the descriptions of FIGS. 6-10 and 20-22.

With continued reference to FIG. 13, for each sub-sector geographic area in the RF coverage map, a geo-bin is used to store signal strengths for the corresponding sub-sector geographic area. The RF coverage level for the sub-sector geographic area is updated over time by averaging (or by taking a median value) over multiple records of signal strength measurements. Study has shown that the longer the observation period, the more accurate the results are for the corresponding RF coverage level. For example, eight hours of signal strength measurements results in an RF coverage level that is more accurate than signal strength measurements spanning one hour for the same area.

An exemplary embodiment of techniques for estimating the geographic location of a mobile station for category 1 and category 2 circumstances are described below. RF coverage maps may be built up by taking enough measurement data over a suitable period of time to generate suitable initial RF coverage maps. For example, taking eight hours of per call measurement data (PCMD) in down town busy areas may be used to generate an RF coverage map. The RF coverage maps my be built up from geographic locations for the mobile stations obtained using the techniques described herein or by other suitable location determining techniques.

The measurement data may be divided into category 1 and category 2 circumstances. Category 1 measurements contain signal strength measurements by the mobile station from the same base station, but different sectors. The rest of the measurement data belongs to category 2 circumstances.

Each category may be further divided into sub categories. An example of how to generate an initial RF coverage map for base station 1, sector α for subcategory 1A circumstances is based on the mobile station seeing two pilots from different sectors (sector α and sector β) of base station 1. Both pilots may be used to estimate the mobile station location by using a suitable embodiment of the algorithm disclosed herein. In addition, the pilot from base station 1, sector α may also be used to plot an RF coverage map for the corresponding sector α antenna based on category 1A geographic location estimates for the mobile station.

Similarly, an example of how to generate an initial RF coverage map for base station 1, sector α for subcategory 1B circumstances is based on the mobile station seeing two pilots from different sectors (sector β and sector γ) of base station 3 and one pilot from base station 1, sector α. The two pilots from base station 3, sector β and sector γ are used to estimate the mobile location by using the algorithm disclosed herein. The pilot from base station 1, sector α may be used to plot an RF coverage map for the corresponding sector α antenna based on category 1B geographic location estimates for the mobile station.

As for subcategory 2A, the mobile station only sees a single pilot from base station 1, sector α. Hence, in subcategory 2A circumstances, the mobile station is around a bore sight area for base station 1, sector α where it is most likely that only one pilot is seen by the mobile station. Here, the mobile station location is estimated by using the pilot information, distance information, and RF coverage levels and corresponding geo-bin information for sub-sector geographic areas that are neighboring potential sub-sector geographic areas with RF coverage levels showing that previous signal strength measurements are lacking. With the geographic location for the mobile station identified, the pilot from base station 1, sector α may also be used to supplement (or plot) an RF coverage map of the sector under category 2 circumstances.

As for subcategory 2B, the mobile station sees one pilot from base station 1, sector α and another pilot from base station 2, sector β. Hence, in subcategory 2B circumstances, the mobile station is around an area between base station 1 and base station 2. Here, the mobile station location is estimated using both pilots information and distance information combined with RF coverage levels and corresponding geo-bin information for sub-sector geographic areas that are neighboring potential sub-sector geographic areas with RF coverage levels showing that previous signal strength measurements are lacking to get a more accurate estimation of the mobile station location. With the geographic location for the mobile station identified, the pilot from base station 1, sector α may also used to supplement (or plot) an RF coverage map of the sector under category 2 circumstances.

Figure 14:
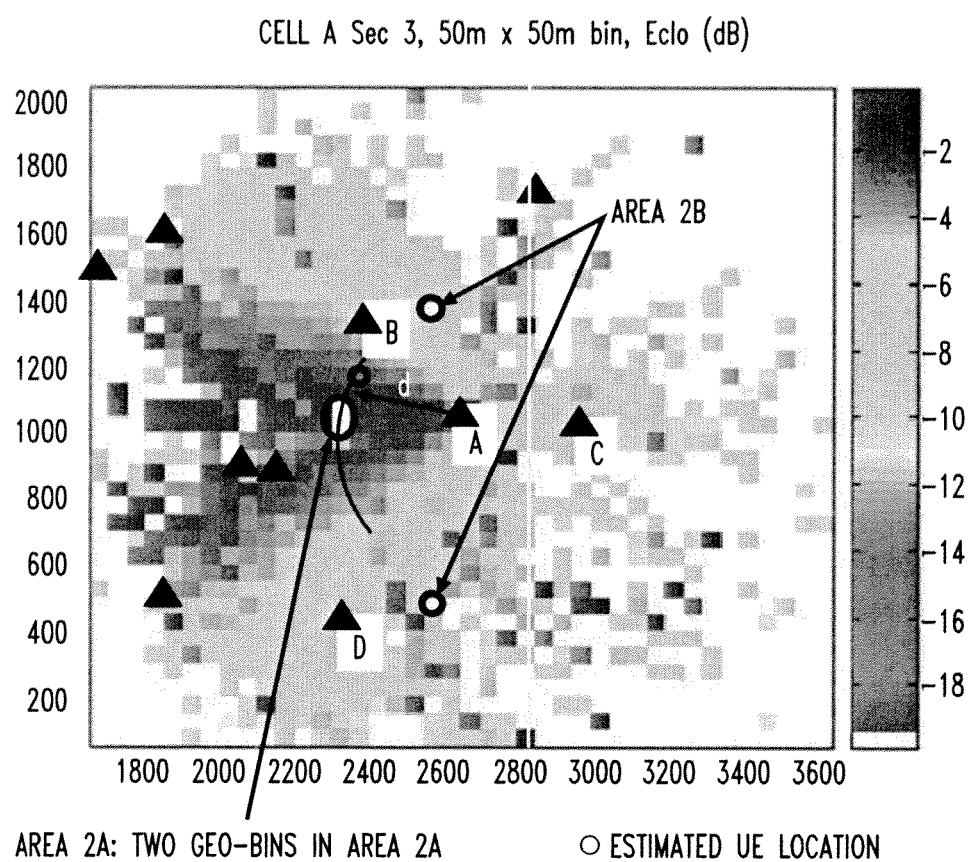
FIG. 14 is an example of an RF coverage map for a sector antenna of a base station that is used in relation to an exemplary embodiment of a technique for estimating the geographic location of a mobile station.

With reference to FIG. 14, an example of an RF coverage map for a sector antenna of a base station is shown that can be used in conjunction with an exemplary embodiment of a technique for estimating the geographic location of a mobile station. In various exemplary embodiments of techniques for estimating the geographic location of a mobile station, the category 1 measurements can be used to build category 1 RF coverage maps (including measurements associated with subcategory 1A and subcategory 1B circumstances). Various embodiments of the algorithm to obtain mobile station geographic location in category 1 circumstances is described in more detail below in the descriptions of FIGS. 1-12 and 17-19.

Figure 15:
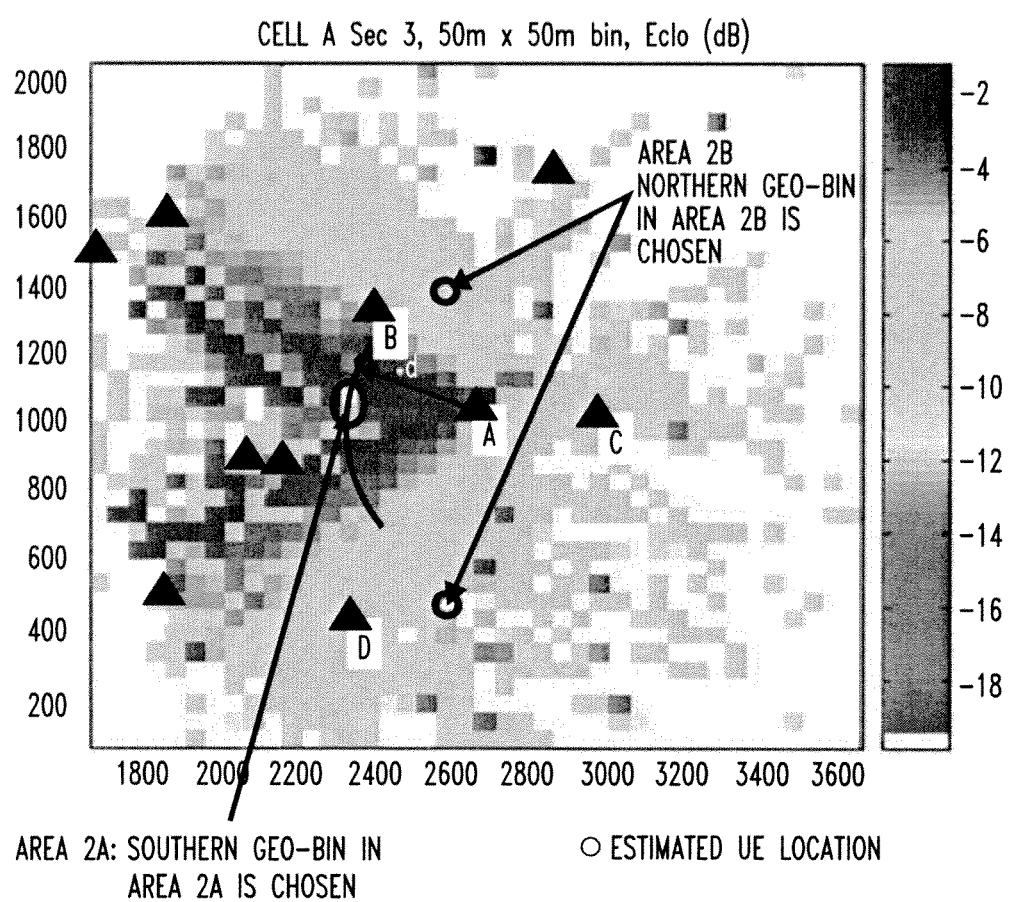
FIG. 15 is another example of an RF coverage map for a sector antenna of a base station that is updated in conjunction with an exemplary embodiment of a technique for estimating the geographic location of a mobile station.

With continued reference to FIGS. 14 and 15, signal strength measurements from category 2 circumstances can be combined with category 1 RF coverage maps and/or existing signal strength measurement information stored in geo-bins associated with neighboring sub-sector geographic areas to generate category 2 RF coverage maps. For example, in FIG.

14, in a category 1 area, including areas for subcategory 1A and subcategory 1B circumstances, an RF coverage map for base station A, sector 3 is already built from previous category 1 signal strength measurements. The category 1 RF coverage map shows that areas for subcategory 2A and subcategory 2B for base station A, sector 3 do not currently have valid Ec/Io information.

As for subcategory 2A, the mobile station sees a pilot from base station A, sector 3 with Ec/Io at −5 dB. In the mean time, base station A, sector 3 measured the round trip delay associated with the mobile station to be equivalent to distance d. In this example, there are two sub-sector geographic areas and corresponding geo-bins that are associated with the distance d criteria in the area associated with subcategory 2A circumstances. The technique goes on to determine which sub-sector geographic area or corresponding geo-bin signal measurements in the area for subcategory 2A circumstances is associated with the mobile station location.

In the embodiment being described, the sub-sector geographic area and corresponding geo-bin in the base station A, sector 3 area just north of the area associated with subcategory 2A circumstances has Ec/Io at −2 dB. The sub-sector geographic area and corresponding geo-bin in the base station A, sector 3 area just south of the area associated with subcategory 2A circumstances has Ec/Io at −6 dB. In this embodiment, the southern sub-sector geographic area and corresponding geo-bin in area associated with subcategory 2A circumstances is chosen to indicate the mobile station location because the measurement report of pilot Ec/Io at −5 dB is closer to −6 dB than −2 dB. The updated overall RF coverage map for base station A, sector 3 is shown in FIG. 15.

With continued reference to FIG. 14, as for subcategory 2B, the mobile station sees a pilot from base station A, sector 3 with Ec/Io at −7 dB and another pilot from base station B, sector 2. In the mean time, base station A, sector 3 measured the round trip delay associated with the mobile station to be equivalent to distance d. In this example, there are two sub-sector geographic areas and corresponding geo-bins that are associated with the distance d in the area associated with subcategory 2B measurements. In the embodiment being described, the sub-sector geographic areas and corresponding geo-bins neighboring the areas associated with the category 2B circumstances in the base station A, sector 3 coverage area have pilot Ec/Io signals around −7 dB. The next step is to determine which sub-sector geographic area and corresponding geo-bin in the potential category 2B areas the mobile station is located.

In the embodiment being described, the northern sub-sector geographic area and corresponding geo-bin is chosen to indicate the mobile station location because the northern bin is located between base station A and base station B where it is most likely that pilots from both base stations can be seen by the mobile station. The updated overall RF coverage map for base station A, sector 3 is shown in FIG. 15.

With reference to FIGS. 14 and 15, the RF coverage level for the sub-sector geographic area can continue to be updated in the RF coverage maps for each individual base station (i.e., sector antenna) by averaging (or by taking the median value) over multiple records for a corresponding geo-bin.

Figure 16:
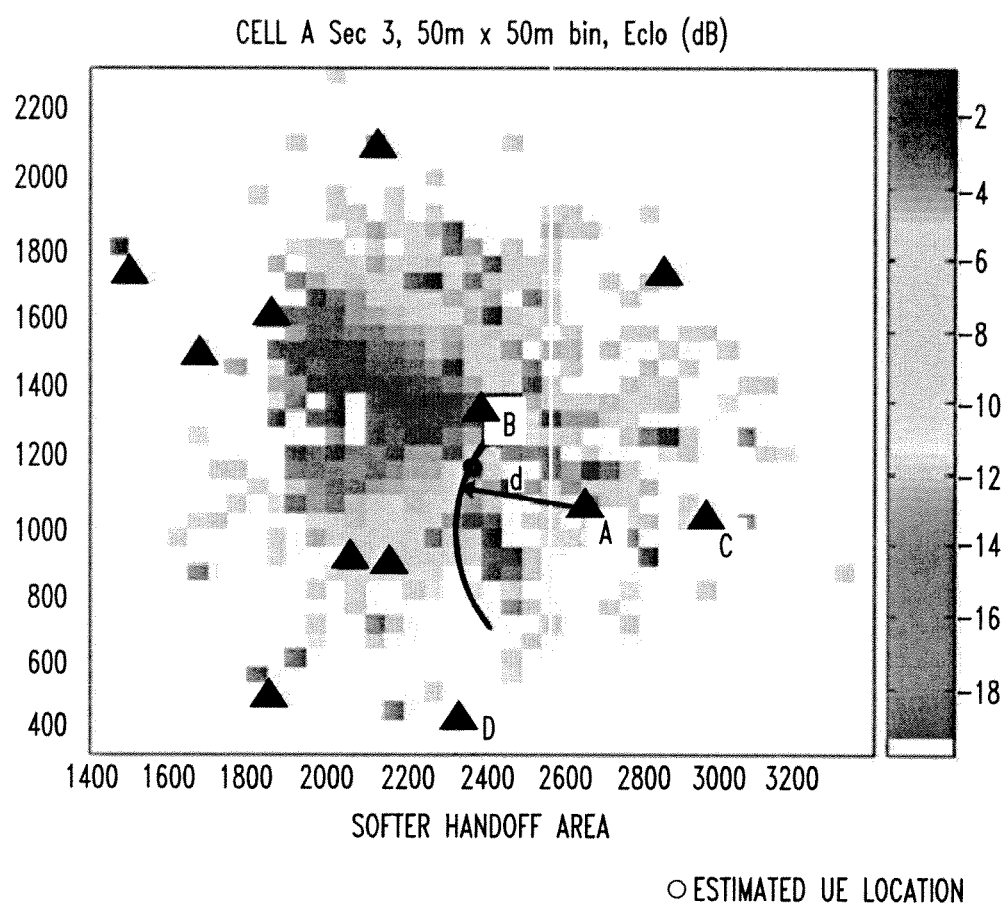
FIG. 16 is yet another example of an RF coverage map for a sector antenna of a base station that is used in relation to another exemplary embodiment of a technique for estimating the geographic location of a mobile station.

With reference to FIG. 16, yet another example of an RF coverage map for a sector antenna of a base station is shown that can be used in conjunction with another exemplary embodiment of a technique for estimating the geographic location of a mobile station. In this embodiment, the geographic location of a mobile station can be estimated based on RF coverage maps for various circumstances, such as dropped call locations. Study has shown that the longer the observation period, the more accurate the results are for the corresponding RF coverage level. On the other hand, for some events, like dropped calls, it is very important to know where the calls are dropped. However, under normal circumstances, dropped calls are not experienced very often in the wireless network. In another exemplary embodiment, a technique for estimating the location of a mobile station includes an algorithm to estimate dropped call locations for mobile stations on existing RF coverage maps.

In this embodiment, the mobile station reports Ec/Io of base station A, sector 3 at −3 dB and Ec/Io of base station B, sector 3 at −4 dB. The distance between the mobile station and the serving sector antenna (i.e., base station A, sector 3) is determined to be distance d. The process uses existing RF coverage maps for these sectors to identify RF coverage levels and corresponding geo-bins that closely match these signal strength measurements. Moreover, the process uses the distance measurement to define a circle centered at base station A with a radius defined by distance d on which the closely matching RF coverage levels and corresponding geo-bins are identified.

For example, the closely matching RF coverage levels for sub-sector geographic areas and corresponding geo-bins in a first RF coverage map for base station A may have Ec/Io values within a range of −3 dB+/−Threshold_s, where Threshold_s is a threshold for the serving sector antenna (i.e., base station A, sector 3). For example, Threshold_s can be set at 0.25 dB. Similarly, the closely matching RF coverage levels for sub-sector geographic areas and corresponding geo-bins in a second RF coverage map for base station B may have Ec/Io values within a range of −4 dB+/−Threshold_n, where Threshold_n is a threshold for the neighboring sector antenna (i.e., base station B, sector 3). For example, Threshold_n can be set at 0.5 dB. The red dot in FIG. 16 shows the estimated mobile station location after overlaying the sub-sector geographic area identified in the second RF coverage map on the first RF coverage map to locate matching RF coverage levels from both RF coverage maps that intersect.

With reference to FIG. 17, an exemplary embodiment of a process 1700 for estimating a geographic location of a mobile station within a coverage area of a wireless network begins at 1702 where an instant angular position of an individual mobile station in relation to a first base station is calculated. The first base station including multiple sector antennas. The instant angular position based at least in part on a first signal strength measurement, a second signal strength measurement, and an angular position reference that extends outward from the first base station. The first and second signal strength measurements related in calendar time and representative of power characteristics of respective RF signals received by the individual mobile station from corresponding first and second sector antennas of the first base station.

With reference to FIGS. 17 and 18, another exemplary embodiment of a process 1800 for estimating a geographic location of a mobile station within a coverage area of a wireless network includes the process 1700 of FIG. 17 and continues at 1802 where a radial distance of the individual mobile station from the first base station is determined. The radial distance based at least in part on a round trip measurement associated with elapsed time between sending an outgoing signal from the first base station to the individual mobile station and receiving a corresponding acknowledgement signal from the individual mobile station at the first base station. The round trip measurement related in calendar time to the first and second signal strength measurements.

In another embodiment, the process 1800 also includes identifying an instant geographic location of the individual mobile station in a coverage area of a wireless network formed by at least the first base station. The instant geographic location based at least in part on an intersection of a line extending outward from the first base station at the instant angular position with a circle having a center defined by the first base station and a radius defined by the radial distance.

In further embodiment, the process 1800 also includes correlating the instant geographic location of the individual mobile station with a first sub-sector geographic area in a first RF coverage map for the first sector antenna based at least in part on a reference location for the first base station in the first RF coverage map. The first RF coverage map formed by a plurality of sub-sector geographic areas. Each sub-sector geographic area uniquely identified and associated with a corresponding geographic location bin for the first RF coverage map for storage of signal strength measurements from the first sector antenna associated with the corresponding sub-sector geographic area. In this embodiment, the process 1800 also includes sending the first signal strength measurement to a first geographic location bin associated with the unique identifier for the first sub-sector geographic area for storage in conjunction with computation of a representative RF coverage level for populating the first sub-sector geographic area in the first RF coverage map.

In another further embodiment, the process 1800 also includes correlating the instant geographic location of the individual mobile station with a second sub-sector geographic area in a second RF coverage map for the second sector antenna based at least in part on a reference location for the first base station in the second RF coverage map. The second RF coverage map formed by a plurality of sub-sector geographic areas. Each sub-sector geographic area uniquely identified and associated with a corresponding geographic location bin for the second RF coverage map for storage of signal strength measurements from the second sector antenna associated with the corresponding sub-sector geographic area. In this embodiment, the process 1800 also includes sending the second signal strength measurement to a second geographic location bin associated with the unique identifier for the second sub-sector geographic area for storage in conjunction with computation of a representative RF coverage level for populating the second sub-sector geographic area in the second RF coverage map.

With reference to FIGS. 17 and 19, yet another exemplary embodiment of a process 1900 for estimating a geographic location of a mobile station within a coverage area of a wireless network includes the process 1700 of FIG. 17 and continues at 1902 where a radial distance of the individual mobile station from a second base station serving the individual mobile station is determined. The second base station including multiple sector antennas. The radial distance based at least in part on a round trip measurement associated with elapsed time between sending an outgoing signal from the second base station to the individual mobile station and receiving a corresponding acknowledgement signal from the individual mobile station at the second base station. The round trip measurement related in calendar time to the first and second signal strength measurements.

In another embodiment, the process 1900 also includes identifying an instant geographic location of the individual mobile station in a coverage area of a wireless network formed by at least the first and second base stations. The instant geographic location based at least in part on an intersection of a line extending outward from the first base station at the instant angular position with a circle having a center defined by the second base station and a radius defined by the radial distance.

In a further embodiment of the process 1900, a signal strength measurement report from the individual mobile station comprising the first and second signal strength measurements also includes a third signal strength measurement. The third signal strength measurement representative of the power characteristic of a third RF signal received by the individual mobile station from a third sector antenna of the second base station. In this embodiment, the process 1900 also includes correlating the instant geographic location of the individual mobile station with a third sub-sector geographic area in a third RF coverage map for the third sector antenna based at least in part on a reference location for the second base station in the third RF coverage map. The third RF coverage map formed by a plurality of sub-sector geographic areas. Each sub-sector geographic area uniquely identified and associated with a corresponding geographic location bin for the third RF coverage map for storage of signal strength measurements from the third sector antenna associated with the corresponding sub-sector geographic area. In the embodiment being described, the process 1900 also includes sending the third signal strength measurement to a third geographic location bin associated with the unique identifier for the third sub-sector geographic area for storage in conjunction with computation of a representative RF coverage level for populating the third sub-sector geographic area in the third RF coverage map.

With reference to FIG. 20, still another exemplary embodiment of a process 2000 for estimating a geographic location of a mobile station within a coverage area of a wireless network begins at 2002 where a radial distance of an individual mobile station from a first base station serving the individual mobile station is calculated. The first base station including multiple sector antennas. The radial distance based at least in part on a round trip measurement associated with elapsed time between sending an outgoing signal from the first base station to the individual mobile station and receiving a corresponding acknowledgement signal from the individual mobile station at the first base station. Next, the process determines a signal strength report from the individual mobile station provided to the first base station related in calendar time to the round trip measurement includes a first signal strength measurement representative of a power characteristic of a first RF signal received by the individual mobile station from a first sector antenna of the first base station (2004). The signal strength report not including other signal strength measurements for other sector antennas of the first base station.

At 2006, an instant geographic location of the individual mobile station is identified in a coverage area of a wireless network formed by at least the first base station. The instant geographic location based at least in part on an intersection of a circle having a center defined by the first base station and a radius defined by the radial distance with a first sub-sector geographic area in a first RF coverage map for the first sector antenna. The first RF coverage map including a first reference location for the first base station to facilitate correlation of the circle to the first RF coverage map. The first RF coverage map formed by a plurality of sub-sector geographic areas. The first RF coverage map populated with representative RF coverage levels associated with previous signal strength measurements for the first sector antenna from one or more mobile stations in previous signal strength reports comprising the corresponding previous signal strength measurement and at least one signal strength measurement from another sector antenna of the first base station. The first sub-sector geographic area in the first RF coverage map is populated with a first RF coverage level representative of lacking previous signal strength measurements.

Figure 21:
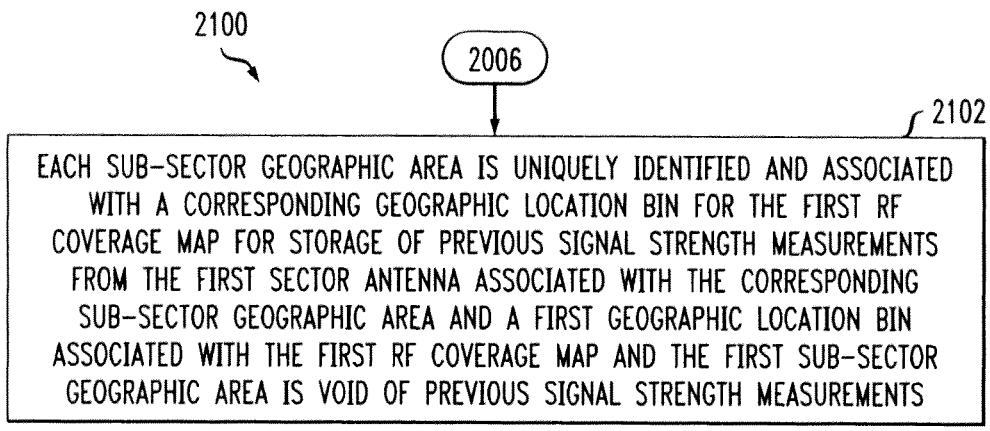
FIG. 21, in combination with FIG. 20, is a flow chart of still yet another exemplary embodiment of a process for estimating a geographic location of a mobile station within a coverage area of a wireless network.

With reference to FIGS. 20 and 21, still yet another exemplary embodiment of a process 2100 for estimating a geographic location of a mobile station within a coverage area of a wireless network includes the process 2000 of FIG. 20. In this embodiment of the process 2100, each sub-sector geographic area is uniquely identified and associated with a corresponding geographic location bin for the first RF coverage map for storage of previous signal strength measurements from the first sector antenna associated with the corresponding sub-sector geographic area and a first geographic location bin associated with the first RF coverage map and the first sub-sector geographic area is void of previous signal strength measurements (2102).

In another embodiment, the process 2100 also includes identifying multiple sub-sector geographic areas in the first RF coverage map intersecting the circle associated with the first base station that are populated with the first RF coverage level. In this embodiment, the first signal strength measurement is compared to representative RF coverage levels associated with previous signal strength measurements stored in corresponding geographic location bins for corresponding sub-sector geographic areas of the first RF coverage map neighboring each of the multiple sub-sector geographic areas. In the embodiment being described, the first sub-sector geographic area is selected from the multiple sub-sector geographic areas based at least in part on the neighboring RF coverage level for the first sub-sector geographic area being associated with previous signal strength measurements that are closer to the first signal strength measurement than previous signal strength measurements associated with neighboring RF coverage levels for other sub-sector geographic areas of the multiple sub-sector geographic areas.

In yet another embodiment, the process 2100 also includes sending the first signal strength measurement to a first geographic location bin associated with the unique identifier for the first sub-sector geographic area for storage in conjunction with computation of a representative RF coverage level for populating the first sub-sector geographic area in a second RF coverage map for the first sector antenna. The second RF coverage map formed by a plurality of sub-sector geographic areas. The second RF coverage map populated with representative RF coverage levels associated with previous signal strength measurements for the first sector antenna from one or more mobile stations in previous signal strength reports.

Figure 22:
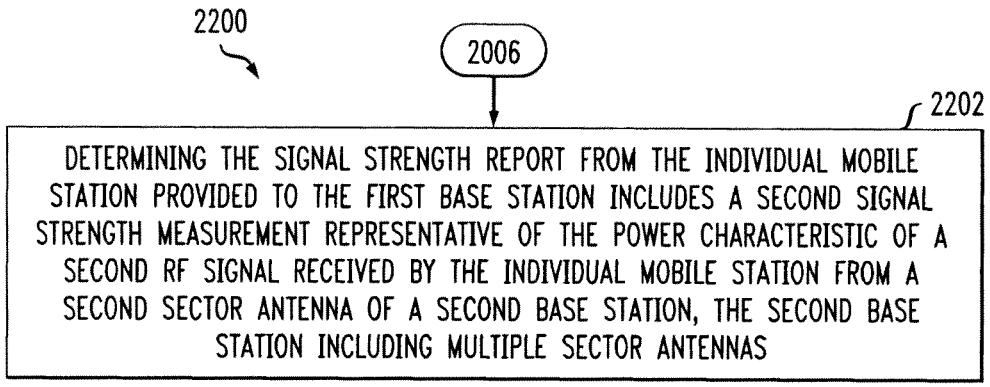
FIG. 22, in combination with FIG. 20, is a flow chart of another exemplary embodiment of a process for estimating a geographic location of a mobile station within a coverage area of a wireless network.

With reference to FIGS. 20 and 22, another exemplary embodiment of a process 2200 for estimating a geographic location of a mobile station within a coverage area of a wireless network includes the process 2000 of FIG. 20 and continues at 2202 with determining the signal strength report from the individual mobile station provided to the first base station includes a second signal strength measurement representative of the power characteristic of a second RF signal received by the individual mobile station from a second sector antenna of a second base station. The second base station including multiple sector antennas. In this embodiment of the process 2200, the first RF coverage map includes a second reference location for the second base station.

In another embodiment, the process 2200 also includes identifying multiple sub-sector geographic areas in the first RF coverage map intersecting the circle associated with the first base station that are populated with the first RF coverage level. In this embodiment, geographic locations of the multiple sub-sector geographic areas in the first RF coverage map are compared to a fixed location for the second base station in relation to the first RF coverage map. In the embodiment being described, the first sub-sector geographic area is selected from the multiple sub-sector geographic areas based at least in part on the geographic location for the first sub-sector geographic area being closer to the fixed location for the second base station than the geographic locations for other sub-sector geographic areas of the multiple sub-sector geographic areas.

In yet another embodiment, the process 2200 also includes correlating the instant geographic location of the individual mobile station with a second sub-sector geographic area in a second RF coverage map for the second sector antenna based at least in part on a second reference location for the first base station in the second RF coverage map. The second RF coverage map formed by a plurality of sub-sector geographic areas. Each sub-sector geographic area uniquely identified and associated with a corresponding geographic location bin for the second RF coverage map for storage of signal strength measurements from the second sector antenna associated with the corresponding sub-sector geographic area. In this embodiment, the process 2200 also includes sending the second signal strength measurement to a second geographic location bin associated with the unique identifier for the second sub-sector geographic area for storage in conjunction with computation of a representative RF coverage level for populating the second sub-sector geographic area in the second RF coverage map for the second sector antenna.

With reference to FIG. 23, yet another exemplary embodiment of a process 2300 for estimating a geographic location of a mobile station within a coverage area of a wireless network begins at 2302 where a radial distance of an individual mobile station from a first base station serving the individual mobile station is calculated in response to detection of a dropped call for the mobile station. The first base station including multiple sector antennas. The radial distance based at least in part on a round trip measurement preceding detection of the dropped call and in proximate time relation to detection of the dropped call. The round trip measurement associated with elapsed time between sending an outgoing signal from the first base station to the individual mobile station and receiving a corresponding acknowledgement signal from the individual mobile station at the first base station. Next, the process determines a signal strength report from the individual mobile station provided to the first base station preceding detection of the dropped call, in proximate time relation to detection of the dropped call, and related in calendar time to the round trip measurement includes a first signal strength measurement representative of a power characteristic of a first RF signal received by the individual mobile station from a first sector antenna of the first base station (2304).

At 2306, an instant geographic location of the individual mobile station is identified in a coverage area of a wireless network formed by at least the first base station. Identification of the instant geographic location is based at least in part on an intersection of a circle having a center defined by the first base station and a radius defined by the radial distance with a first sub-sector geographic area in a first RF coverage map for the first sector antenna. The first RF coverage map including a first reference location for the first base station to facilitate correlation of the circle to the first RF coverage map. The first RF coverage map formed by a plurality of sub-sector geographic areas. The first RF coverage map populated with representative RF coverage levels associated with previous signal strength measurements for the first sector antenna from one or more mobile stations in previous signal strength reports. The first sub-sector geographic area in the first RF coverage map is populated with an RF coverage level representative of a first signal strength value within a first predetermined threshold of the first signal strength measurement.

In another embodiment, the process 2300 also includes identifying multiple sub-sector geographic areas in the first RF coverage map intersecting the circle associated with the first base station that are populated with RF coverage levels representative of first signal strength values within the predetermined threshold of the first signal strength measurement. In this embodiment, the process determines the signal strength report from the individual mobile station provided to the first base station includes a second signal strength measurement representative of the power characteristic of a second RF signal received by the individual mobile station from a second sector antenna of a second base station, The second base station including multiple sector antennas.

In a further embodiment, the process 2300 also includes comparing geographic locations of the multiple sub-sector geographic areas in the first RF coverage map to a fixed location for the second base station in relation to the first RF coverage map. In this embodiment, the first sub-sector geographic area is selected from the multiple sub-sector geographic areas based at least in part on the geographic location for the first sub-sector geographic area being closer to the fixed location for the second base station than the geographic locations for other sub-sector geographic areas of the multiple sub-sector geographic areas.

In another further embodiment, the process 2300 also includes correlating the circle associated with the first base station with a second RF coverage map for the second sector antenna based at least in part on the second RF coverage map including the first reference location for the first base station and a second reference location for the second base station. The second RF coverage map formed by a plurality of sub-sector geographic areas. The second RF coverage map populated with representative RF coverage levels associated with previous signal strength measurements for the second sector antenna from one or more mobile stations in previous signal strength reports. In this embodiment, the process 2300 also includes identifying a second sub-sector geographic area in the second RF coverage map based at least in part on the circle associated with the first base station intersecting at least one sub-sector geographic area in the second RF coverage map populated with an RF coverage level representative of a second signal strength value within a second predetermined threshold of the second signal strength measurement. In the embodiment being described, the second sub-sector geographic area in the second RF coverage map is correlated with the first RF coverage map based at least in part on the first and second RF coverage maps including the first and second reference locations for the first and second base stations to identify the first sub-sector geographic area.

In yet another further embodiment, the process 2300 also includes identifying multiple prospective geographic locations for the mobile station in a second RF coverage map for the second sector antenna. The second RF coverage map including the first reference location for the first base station and a second reference location for the second base station. The second RF coverage map formed by a plurality of sub-sector geographic areas. The second RF coverage map populated with representative RF coverage levels associated with previous signal strength measurements for the second sector antenna from one or more mobile stations in previous signal strength reports. The multiple prospective geographic locations based at least in part on the corresponding sub-sector geographic areas in the second RF coverage map being populated with an RF coverage level representative of a second signal strength value within a second predetermined threshold of the second signal strength measurement. In this embodiment, the process 2300 also includes correlating the multiple prospective geographic locations for the mobile station in the second RF coverage map with the first RF coverage map for the first sector antenna based at least in part on the first and second RF coverage maps including the first reference location for the first base station. In the embodiment being described, identification of the instant geographic location is based at least in part on at least one of the multiple prospective geographic locations intersecting the circle associated with the first base station in the first RF coverage map.

Figure 2:
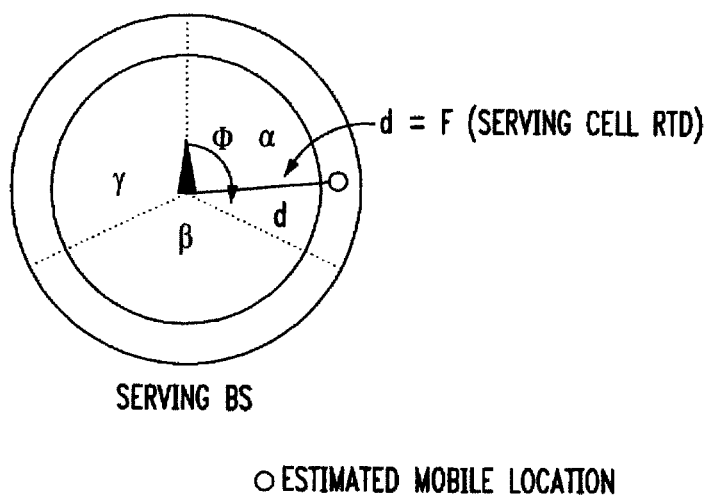
FIG. 2 is a functional diagram showing a serving cell of a wireless network in relation to an exemplary embodiment of another technique for estimating the geographic location of a mobile station.

With reference to FIG. 2, in one embodiment, the technique for estimating the geographic location of the mobile station uses a round trip measurement (e.g., RTD measurement) from a serving base station (i.e., serving cell) to estimate the distance (d) of the mobile station from the serving base station. Then, signal strength measurements from serving and/or neighboring sectors of the serving base station to estimate an azimuth position ($\phi$) of the mobile station in relation to an angular position reference extending outward from the serving base station. Combining the sector coverage areas of the same base station forms a corresponding cellular coverage area for the base station. The individual sector coverage areas may also be referred to as cells in relation to corresponding sector antennas. If so, the corresponding cells for sector antennas associated with the same base station are still usually labeled as sectors (e.g., $\alpha$, $\beta$, $\gamma$ sectors or sectors 1, 2, 3). Normally, the sector antennas associated with the same base station are mounted on the same cell tower (or building). Hence, the radio wave travel from these sector antennas to a given mobile station antenna will experience highly correlated losses (including path loss and shadow fading). The algorithm described herein uses these RF characteristics (i.e., highly correlated losses) to estimate an azimuth position of the mobile station in relation to the serving based station based on the difference of signal strength measurements from multiple sector antennas of the serving base station.

In one embodiment, the algorithm for estimating a geographic location of a mobile station within a coverage area of a wireless network begins with estimating a distance (d) of the mobile station from the serving base station based on a round trip measurement, such as RTD. Next, the azimuth position ($\phi$) of the mobile station in relation to the serving base station is estimated based on signal strength measurements by the mobile station from multiple sector antennas of the serving base station that are reported back by the mobile station to the serving base station via the serving sector antenna. Combining the distance (d) and azimuth position ($\phi$) forms a geographic location of the mobile station in relation to the serving base station with respect to vector represented by a displacement (i.e., distance (d)) and an angular position (i.e., azimuth position ($\phi$)). This polar coordinate-type of geographic notation can be converted to various other forms of geographic notation, including a latitude/longitude notation, an address notation, or a geo-bin tile grid notation associated with the coverage area for the wireless network. For example, the geo-bin tile grid notation may use 50 meter by 50 meter tiles to represent the coverage area for a sector antenna, base station, cluster of base stations, or the overall wireless network. In other embodiments, any suitable tile size may be used to provide a higher or lower resolution of the coverage area.

The approximation algorithm for estimating the geographic location of a mobile station may be based on certain considerations regarding the mobile received power (Pr) (i.e., signal strength measurements) from multiple sector antennas where the sector antennas are located in close proximity to each other, such as mounted on the same cell tower or on the same physical structure at relatively the same elevation. For example, the mobile received power (Pr) is received by the mobile station from multiple sector antennas of the serving base station. The mobile station measures the signal strength of the mobile received power (Pr) signals and may report back the corresponding signal strength measurements in dBm.

Mobile received power (Pr) may be represented by the following equation:

$$Pr(d,\phi,\theta)=Pt-PL(d)-X+Gt(d,\phi,\theta)+Gr \qquad (1),$$

where d is a distance between the serving base station and the mobile station in kilometers (km), $\phi$ is an azimuth position of the mobile station in relation to an angular position reference extending outward from the serving base station, $\theta$ is an azimuth position at which the transmit portion of the corresponding sector antenna is oriented in relation to the angular reference position, Pt is a transmit power for the corresponding sector antenna in dBm, and PL(d) is an average path loss in dB for the corresponding sector antenna. The azimuth position $\theta$ of the sector antenna is known and corresponds to its actual installation. Likewise, the transmit power Pt for the sector antenna is known at the serving base station based on known characteristics of the sector antenna or actual measurements by the base station.

The average path loss PL(d) may be represented by the following equation:

$$PL(d)=K1+K2*\log 10(d) \qquad (2),$$

where K1 and K2 are propagation parameters such that K1 is function of morphology, frequency, cell antenna height, and mobile antenna height and K2 is function of cell antenna height.

With reference again to equation (1), X is a zero-mean Gaussian distributed random variable (in dB) with standard deviation a approximately equal to N(0, $\sigma$). (in dB). X may be referred to as the shadowing fading effect. Gt(d, $\phi$, $\theta$) is the transmit antenna gain at the sector antenna in dB. Gr is receive antenna gain at the mobile station in dB.

Figure 3:
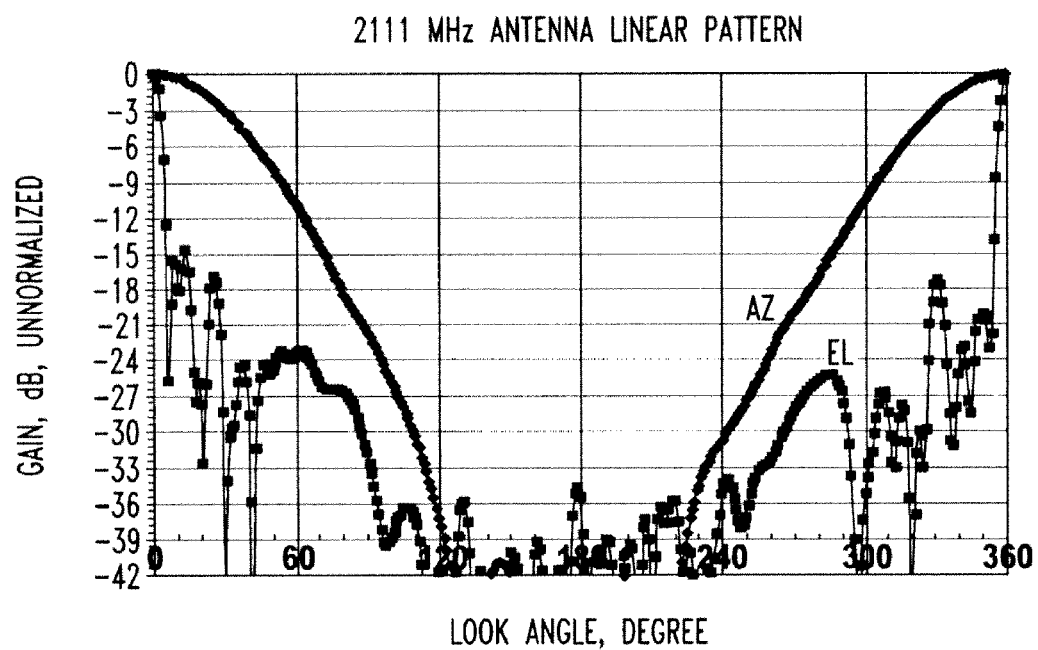
FIG. 3 is a graph showing a transmit antenna gain characteristic for a sector antenna of a base station in which normalized gain in dB is plotted in relation to look angles from the sector antenna to a mobile station in relation to azimuth (i.e., horizontal gain) and elevation (i.e., vertical gain) positions from the orientation of the sector antenna.

With reference to FIG. 3, Gt(d, $\phi$, $\theta$) reflects that Gt is a function of mobile distance (d) and an angle between the azimuth position ($\phi$) of the mobile station and the azimuth position ($\theta$) of the corresponding sector antenna. Note, the distance (d), in combination with the sector antenna height, is used to estimate an antenna tile and an antenna downtile. The azimuth position ($\phi$) of the mobile station and the azimuth position ($\theta$) of the corresponding sector antenna are used to determine a horizontal gain portion of Gt, where the look angle is $\phi-\theta$. The distance (d) and the height (i.e., elevation) of the corresponding sector antenna are used to determine a vertical gain component of Gt.

The signal strength measurements for mobile received power Pr may be reported as received signal reference power (RSRP) measurements, reference signal received quality (RSRQ) measurements, or Ec/Io measurements. RSRQ is the ratio of received signal reference power to total received power. Ec/Io is the ratio in dB between the pilot energy accumulated over one PN chip period ("Ec") to the total power spectral density in the received bandwidth ("Io").

Mobile received power Pr1 and Pr2 from two sector antennas of the serving base station in dBm may be represented by the following equations:

$$Pr1(d,\phi,\theta 1)=Pt1-PL(d)-X+Gt1(d,\phi,\theta 1)+Gr \qquad (3),$$

$$Pr2(d,\phi,\theta 2)=Pt2-PL(d)-X+Gt2(d,\phi,\theta 2)+Gr+\epsilon \qquad (4).$$

The path loss and shadowing fading effect from different sector antennas of the same base station can be assumed to be equal where the sector antennas are mounted on the same cell tower or building. The close proximity of the sector antennas results in high correlation of between these components of the mobile received power Pr1 and Pr2. For example, the differences of shadow fading are expected to be very small and are counted by E in equation (4). As mentioned above, d, $\theta 1$ and $\theta 2$ are known values.

Based on the foregoing, an estimate of the azimuth position ($\phi$) of the mobile station may be based on the difference of mobile received power from the two sector antennas (Pr1–Pr2) in dB. For example, (Pr1–Pr2) can be (RSRP1–RSRP2) or (RSRQ1–RSRQ2) in an LTE network. Similarly, (Pr1–Pr2) can be (Ec/Io)1–(Ec/Io)2 in a CDMA network. Even though the mobile received power Pr1 and Pr2 are expressed in absolute received power format (i.e., dBm), the estimation of mobile location does not require the knowledge of absolute received power information. RSRQ for LTE and pilot Ec/Io for CDMA can be used in the same manner as mentioned above.

Based on the foregoing, the difference between the mobile received power Pr1 and Pr2 can be represented by the following equation:

$$(Pr1-Pr2)=(Gt1(\phi)-Gt2(\phi))+(Pt1-Pt2) \qquad (5),$$

where $\phi$ can be substituted with a potential azimuth position $\phi m$ for the mobile station in the range of 0 to 360 degrees. The potential azimuth position $\phi m$ that results in the closest match between the right and left sides of equation (5) can be used as estimated azimuth position of the mobile station.

Based on the foregoing, the azimuth position of the mobile station can be represented by the following equation:

$$F(\phi)=|(Gt1(\phi)-Gt2(\phi))+(Pt1-Pt2)-(Pr1-Pr2)| \qquad (6),$$

where $\phi$ can be substituted with a potential azimuth position $\phi m$ for the mobile station in the range of 0 to 360 degrees. The potential azimuth position $\phi m$ that minimizes $F(\phi m)$ can be used as estimated azimuth position of the mobile station.

This process can also be expressed in the following equation:

$$\min|(Gt1(\phi)-Gt2(\phi))+(Pt1-Pt2)-(Pr1-Pr2)| \qquad (7).$$

Notably, the value selected for the initial potential azimuth position $\phi m$ in equations (5) through (7) can be based at least in part on the knowledge of the orientation and azimuth position of the serving sector antenna. Subsequent values selected for the potential azimuth position $\phi m$ can be based on whether the subsequent result is approaching or receding from the desired result. Various techniques can also be used to select subsequent values for the potential azimuth position $\phi m$ based on the magnitude of the difference between the subsequent result and the desired result as well as the change in the difference between consecutive subsequent results and the desired result.

Figure 11:
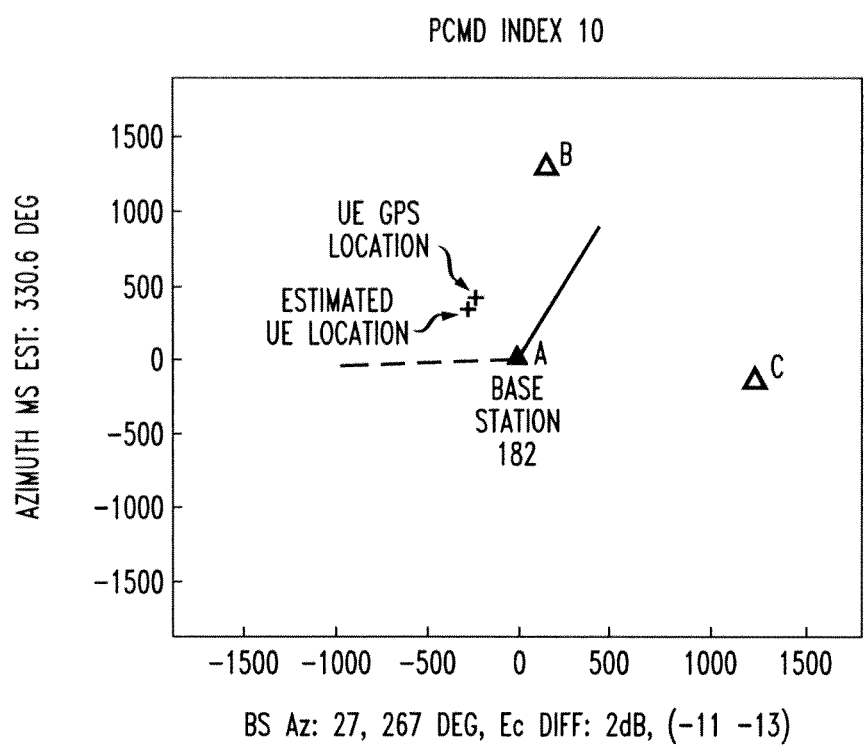
FIG. 11 is a bird's eye view of a coverage area of an exemplary base station in a wireless network showing an estimated geographic location and a GPS location for a mobile station.

With reference to FIG. 11, a bird's eye view of a coverage area of an exemplary base station A in a wireless network shows an estimated geographic location for a mobile station (UE) resulting from the process disclosed herein. A geographic location for the mobile station (UE) based on GPS location is also shown for comparison. The X and Y axes for the coverage area reflect distance in meters from the base station A. Notably, the estimated geographic location is close to the GPS location.

The base station A includes a first sector antenna oriented at 27 degrees from north (i.e., an angular position reference representing 0/360 degrees) and a second sector antenna oriented at 267 degrees. The mobile station reported signal strength measurements from the first and second sector antennas at −11 dB and −13 dB, respectively. The angular position of the mobile station was estimated at 330.6 degrees using the process disclosed herein. The measurements used to estimate the geographic location of the mobile station were retrieved from per call measurement data (PCMD) for an active call associated with the mobile station. For example, the PCMD data may be stored by a wireless service provider during network operations for billing purposes. The process disclosed herein may use signal strength measurements and round trip measurements captured and retained during network operations via any suitable techniques without requiring additional network overhead for collection of data to perform the estimate of the geographic location of the mobile station.

Figure 12:
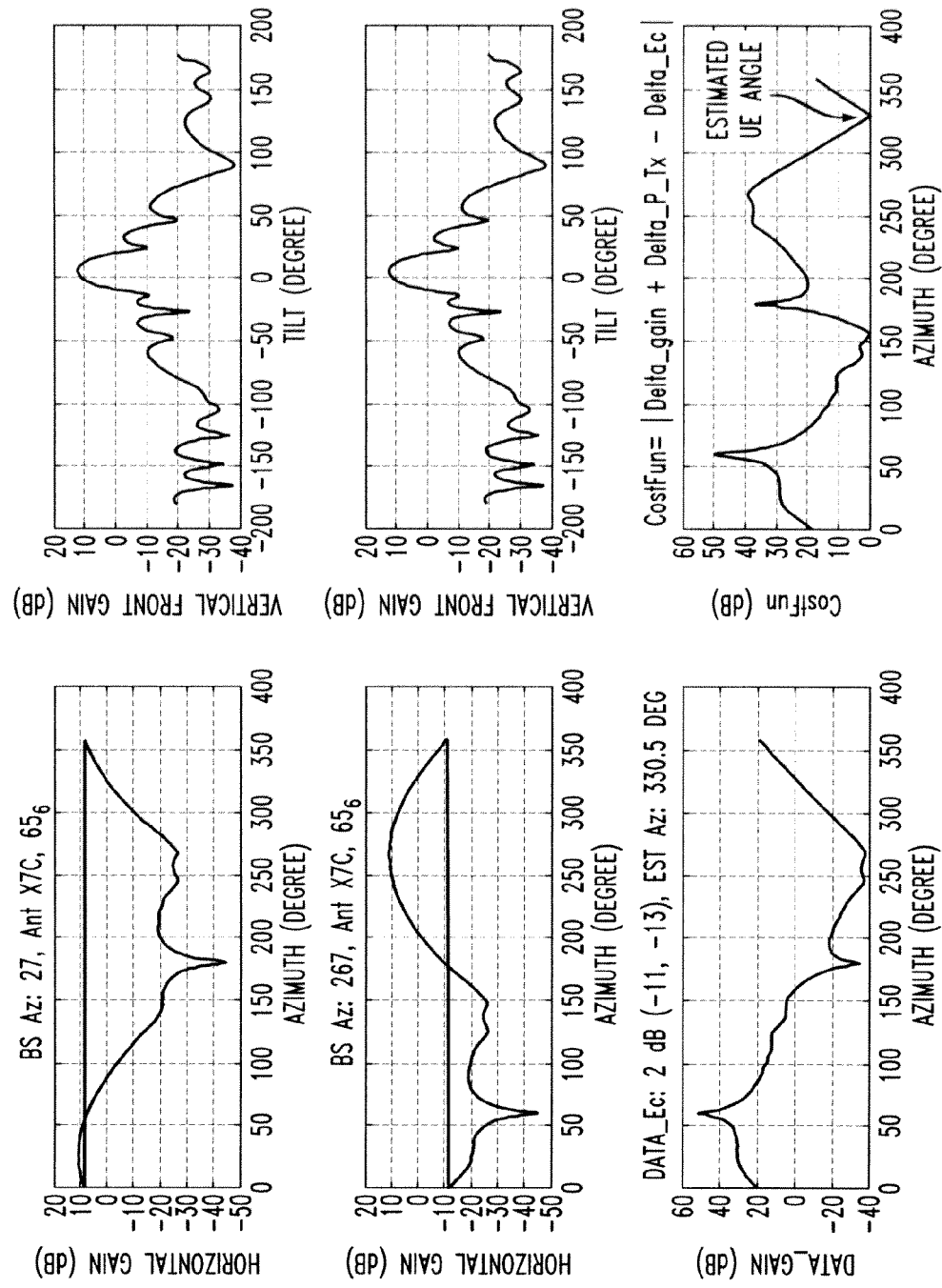
FIG. 12 is a set of graphs showing azimuth gain parameter characteristics for two sector antennas of a base station, elevation gain parameter characteristics for the two sector antennas, a composite graph showing the difference between gains for the two sector antennas, and a graph of a function of the angular position of the mobile station in relation to the delta antenna gain component, a delta transmit parameter component, and a delta signal strength measurement component.

With reference to FIG. 12, various data and calculations associated with the process for estimating the geographic location of a mobile station is provided in a set of graphs. The upper left graph shows an azimuth gain parameter characteristic for a first sector antenna of a serving base station. The first sector antenna is oriented at 27 degrees from north (i.e., an angular position reference representing 0/360 degrees). The middle left graph shows an azimuth gain parameter characteristic for a second sector antenna of a serving base station. The second sector antenna is oriented at 267 degrees from north. The azimuth gain parameter characteristics may be manufacturer's specifications of power measurements from the sector antennas from relatively close (e.g., 10 meters) to the base station where little or no path loss is experienced. As shown, the first and second sector antennas have the same azimuth gain characteristic merely shifted by the orientation of the antennas. In other base station arrangements, the sector antennas may have different azimuth gain characteristics.

The upper right graph shows an elevation gain parameter characteristic for the first sector antenna. The first sector antenna is oriented at 2 degrees down from horizontal (i.e., an elevation position reference representing 0/360 degrees). The middle right graph shows an elevation gain parameter characteristic for the second sector antenna. The second sector antenna is also oriented at 2 degrees down from horizontal. The elevation gain parameter characteristics may be manufacturer's specifications of power measurements from the sector antennas from relatively close (e.g., 10 meters) to the base station where little or no path loss is experienced. As shown, the first and second sector antennas have the same elevation gain characteristic. In other base station arrangements, the sector antennas may have different elevation gain characteristics. Also, the sector antennas may be oriented at different angles from the horizontal in other base station arrangements.

The lower left graph is a composite graph showing the difference between gains for the first and second sector antennas. The composite graph takes the azimuth and elevation gain characteristics into account to form a composite delta gain characteristic. The composite graph reflects differences in relation to varying azimuth position that follows the azimuth gain characteristics and a relatively steady state component from the elevation gain characteristics because the elevation tilt of the antennas is not changing. The following equation is used to populate the composite graph:

$$(Gt1(\phi)_{az}+Gt1_{el}-Gt1_{max})-(Gt2(\phi)_{az}+Gt2_{el}-Gt2_{max}) \qquad (8),$$

where $Gt1(\phi)_{az}$ is the azimuth gain for the first sector antenna for a given azimuth angle in relation to the angular position reference, $Gt1_{el}$ is the elevation gain for the first antenna associated with the elevation tilt, and $Gt1_{max}$ is the maximum gain for the first sector antenna. Similarly, $Gt2(\phi)_{az}$ is the azimuth gain for the second sector antenna for a given azimuth angle in relation to the angular position reference, $Gt2_{el}$ is the elevation gain for the second antenna associated with the elevation tilt, and $Gt2_{max}$ is the maximum gain for the second sector antenna.

The lower right graph shows a function of the angular position of the mobile station in relation to the delta antenna gain component, a delta transmit parameter component, and a delta signal strength measurement component as defined above in equation (7).

With reference to FIG. 4, an exemplary embodiment of a process 400 for estimating a geographic location of a mobile station within a coverage area of a wireless network begins at 402 where a radial distance of a mobile station from a base station serving the mobile station is determined. The base station includes multiple sector antennas. The radial distance is based at least in part on a round trip measurement associated with elapsed time between sending an outgoing signal from the base station to the mobile station and receiving a corresponding acknowledgement signal from the mobile station at the base station. At 404, a current angular position of the mobile station in relation to the radial distance from the serving base station is calculated. The current angular position is based at least in part on a first signal strength measurement, a second signal strength measurement, and an angular position reference that extends outward from the serving base station. The first and second signal strength measurements representative of power characteristics of respective RF signals received by the mobile station from corresponding first and second sector antennas of the serving base station.

With reference to FIGS. 4 and 5, another exemplary embodiment of a process 500 for estimating a geographic location of a mobile station within a coverage area of a wireless network includes the process 400 of FIG. 4 and continues at 502 where a current geographic location of the mobile station in a coverage area of the wireless network is identified in a geographic notation. The geographic notation is based at least in part on combining the radial distance and current angular position of the mobile station relative to the serving base station. In one embodiment, the radial distance and current angular position reflect a polar coordinate-type of geographic notation in reference to the serving base station. In other embodiments, the radial distance and current angular position can be converted into various types of geographic notation, such as a latitude/longitude notation, an address notation, or a geo-bin tile grid notation associated with the coverage area for the wireless network.

In another embodiment, the process 500 also includes sending the current geographic location of the mobile station in the geographic notation to a geo-location storage node associated with the wireless network. In a further embodiment, the determining, calculating, identifying, and sending are performed by the serving base station.

In yet another embodiment, the process 500 also includes receiving the round trip measurement, first signal strength measurement, and second signal strength measurement from the serving base station via the wireless network at a geo-location service node associated with the wireless network. In this embodiment, the current geographic location of the mobile station is sent in the geographic notation to a geo-location storage device associated with the geo-location service node. In the embodiment being described, the receiving, determining, calculating, identifying, and sending are performed by the geo-location service node.

In still another embodiment, the process 500 also includes receiving the round trip measurement, first signal strength measurement, and second signal strength measurement from the serving base station via the wireless network at a network management node associated with the wireless network. In this embodiment, the round trip measurement, first signal strength measurement, and second signal strength measurement are stored at a measurements storage device associated with the network management node. In the embodiment being described, the round trip measurement, first signal strength measurement, and second signal strength measurement are retrieved from the measurements storage device in conjunction with the determining and calculating. In this embodiment, the process 500 also includes sending the current geographic location of the mobile station in the geographic notation to a geo-location storage device associated with the network management node. The receiving, storing, retrieving, determining, calculating, identifying, and sending are performed by the network management node in the embodiment being described.

With reference again to FIG. 4, in another embodiment of the process 400, the round trip, first signal strength, and second signal strength measurements are related in calendar time. In a further embodiment, the radial distance and current angular position of the mobile station relative to the serving base station are indicative of a current geographic location of the mobile station in a coverage area of the wireless network in relation to the calendar time associated with the round trip, first signal strength, and second signal strength measurements.

In yet another embodiment of the process 400, the first sector antenna is serving the mobile station and referred to as a serving sector antenna and the second sector antenna is disposed near the first sector antenna and referred to as a neighboring sector antenna. In still another embodiment of the process 400, the round trip measurement is measured by the serving base station. In a further embodiment, the round trip measurement includes a RTD time measurement. In still yet another embodiment of the process 400, the first and second signal strength measurements are measured by the mobile station. In a further embodiment, the first and second signal strength measurements include RSRP measurements, RSRQ measurements, or Ec/Io measurements.

In another embodiment of the process 400, the calculating in 404 may include retrieving first and second transmit parameter values from a storage device associated with the wireless network. The first and second transmit parameter values representative of power characteristics of respective communication signals to be transmitted by the corresponding first and second sector antennas. In this embodiment, the calculating in 404 may also include determining a difference between the first and second transmit parameter values to obtain a first angular position component.

In a further embodiment of the process 400, the calculating in 404 may also include retrieving the first and second signal strength measurements from the storage device. In this embodiment, the calculating in 404 may also include determining a difference between the first and second signal strength measurements to obtain a second angular position component.

In a yet further embodiment of the process 400, the calculating in 404 may also include retrieving a first antenna elevation gain parameter value, a first antenna maximum gain parameter value, and a first antenna azimuth gain parameter characteristic from the storage device. The first antenna azimuth gain parameter characteristic relating first antenna azimuth gain parameter values to variable azimuth positions with respect to the angular position reference. The variable azimuth positions representative of prospective azimuth positions of the mobile station in relation to the angular position reference. The first antenna azimuth gain parameter characteristic based at least in part on a first antenna position value representative of a first azimuth position at which the first sector antenna is oriented in relation to the angular position reference. In this embodiment, a second antenna elevation gain parameter value, a second antenna maximum gain parameter value, and a second antenna azimuth gain parameter characteristic are also retrieved from the storage device. The second antenna azimuth gain parameter characteristic relating second antenna azimuth gain parameter values to the variable azimuth positions. The second antenna azimuth gain parameter characteristic based at least in part on a second antenna position value representative of a second azimuth position at which the second sector antenna is oriented in relation to the angular position reference.

In the embodiment being described, an angular value (e.g., not exceeding 360) may be selected for the variable azimuth position. The first and second antenna azimuth gain parameter characteristics may be used to identify the corresponding first and second antenna azimuth gain parameter values for the variable azimuth position associated with the selected angular value. In this embodiment, the calculating in 404 may continue by determining a difference between first and second transmit antenna gains for the selected angular value. The difference may be determined by adding the first antenna azimuth gain parameter value for the selected angular value to the first antenna elevation gain parameter value and subtracting the first antenna maximum gain parameter value to obtain the first transmit antenna gain, adding the second antenna azimuth gain parameter value for the selected angular value to the second antenna elevation gain parameter value and subtracting the second antenna maximum gain parameter value to obtain the second transmit antenna gain, and subtracting the second transmit antenna gain from the first transmit antenna gain to obtain a third angular position component.

The angular value selected for the initial variable azimuth position can be based at least in part on knowledge of which sector antenna is serving the mobile station and the orientation and azimuth position of the serving sector antenna. Subsequent values selected for the variable azimuth position can be based on whether the subsequent result is approaching or receding from the desired result. Various techniques can also be used to select subsequent values for the variable azimuth position based on the magnitude of the difference between the subsequent result and the desired result as well as the change in the difference between consecutive subsequent results and the desired result.

For example, in a further embodiment of the process 400, the angular value initially selected for the variable azimuth position may be between the first and second antenna position values. In this embodiment, the initial angular value may be representative of a mid-point between the first and second antenna position values. In other words, if the first antenna is oriented to 120 degrees in relation to the angular reference position, a second antenna may be oriented to 240 degrees, and 180 may be selected as the initial angular value for the variable azimuth position because it is at a midpoint between the first and second sector antennas. The selection of other angular values for the variable azimuth position can take into account whether the results are getting better or worse to select angular values to obtain better results. The iterative selection of angular values can be incremental or based on a factor of the difference between the obtained result and the desired result.

In still another further embodiment of the process 400, the calculating in 404 also includes adding the first and third angular position components and subtracting the second angular position component to form an arithmetic result. In the embodiment being described, the arithmetic result is converted to an absolute value. In this embodiment, if the absolute value is within a predetermined threshold of a desired value (e.g., zero), the process 400 continues by identifying the angular value substituted for the variable azimuth position as the current angular position for the mobile station. Otherwise, the process 400 repeats the selecting with a different angular value, repeats the determining of the difference between the first and second transmit gains to obtain a new value for the third angular position component, repeats the adding and subtracting to form the arithmetic result and the determining of the absolute value, and continues the repeating until the absolute value is within the predetermined threshold of the desired value.

In still yet another further embodiment of the process 400, the calculating in 404 also includes adding the first and third angular position components and subtracting the second angular position component to form an arithmetic result. In this embodiment, the arithmetic result is converted to an absolute value. In the embodiment being described, the process 400 repeats the selecting with a different angular value, repeats the determining of the difference between the first and second transmit gains to obtain a new value for the third angular position component, repeats the adding and subtracting to form the arithmetic result and the determining of the absolute value, and continues the repeating until the absolute value is minimized. In this embodiment, the process 400 continues by identifying the corresponding angular value substituted for the variable azimuth position for which the absolute value is minimized as the current angular position for the mobile station.

In another further embodiment of the process 400, the calculating in 404 includes summing the first and third angular position components to form an arithmetic result and comparing the arithmetic result to the second angular position component. In this embodiment, if the arithmetic result is within a predetermined range of the second angular position component, the process 400 continues by identifying the angular value substituted for the variable azimuth position as the current angular position for the mobile station. Otherwise, the process 400 repeats the selecting with a different angular value, repeats the determining of the difference between the first and second transmit gains to obtain a new value for the third angular position component, repeats the summing of the first and third angular position components to form the arithmetic result and the comparing of the arithmetic result to the second angular position component, and continues the repeating until the arithmetic result is within the predetermined range of the second angular position component.

Figure 6:
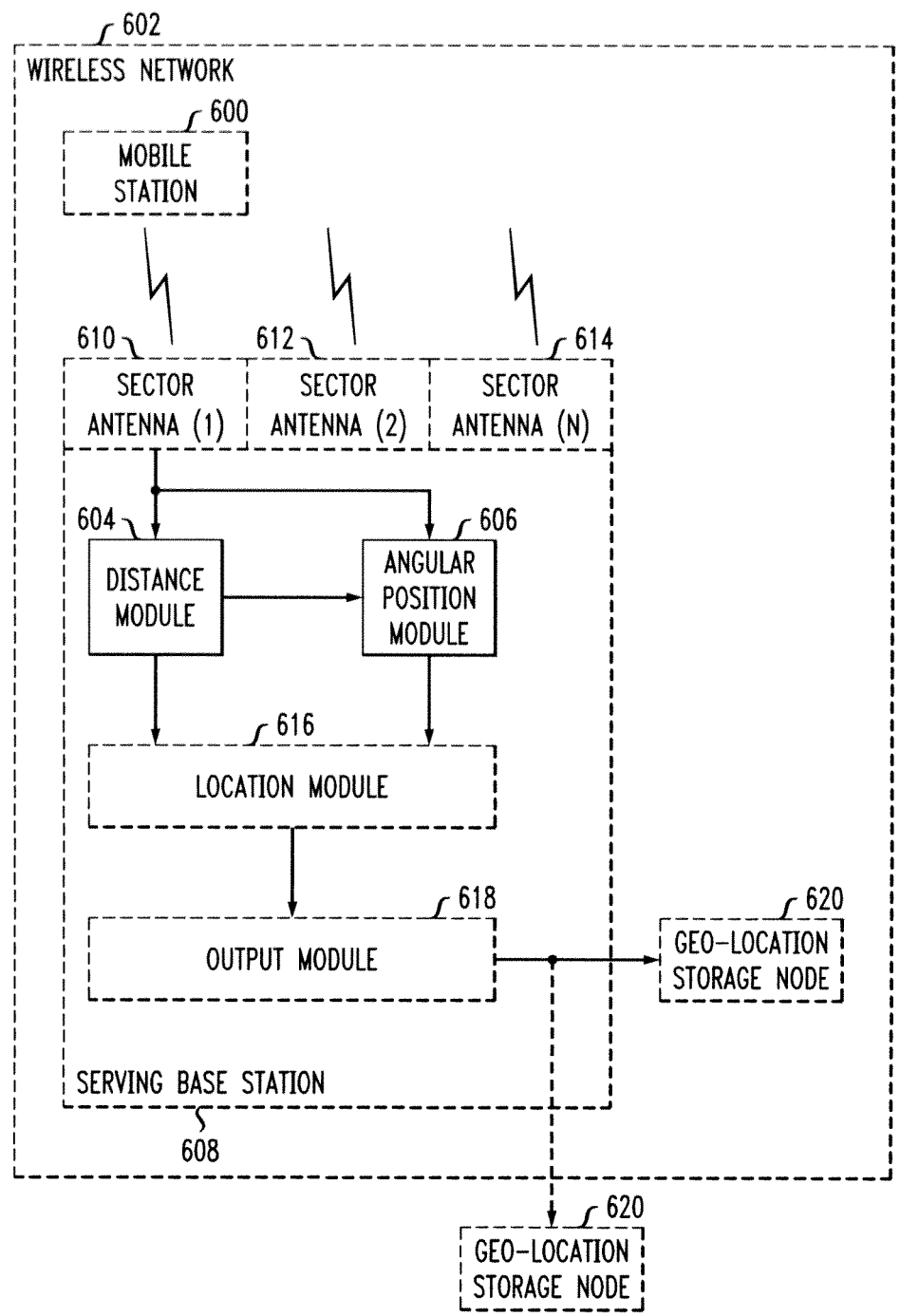
FIG. 6 is a block diagram of an exemplary embodiment of an apparatus within a serving base station of a wireless network for estimating a geographic location of a mobile station within a coverage area of the wireless network.

With reference to FIG. 6, an exemplary embodiment of an apparatus for estimating a geographic location of a mobile station 600 within a coverage area of a wireless network 602 includes a distance module 604 and an angular position module 606. The distance module 604 determines a radial distance of the mobile station 600 from a base station 608 serving the mobile station 600. The base station 608 includes multiple sector antennas (e.g., 610, 612, 614). The radial distance is based at least in part on a round trip measurement associated with elapsed time between sending an outgoing signal from the base station 608 to the mobile station 600 and receiving a corresponding acknowledgement signal from the mobile station 600 at the base station 608. The angular position module 606 is in operative communication with the distance module 604 and calculates a current angular position of the mobile station 600 in relation to the radial distance from the serving base station 608. The current angular position is based at least in part on a first signal strength measurement, a second signal strength measurement, and an angular position reference that extends outward from the serving base station 608. The first and second signal strength measurements representative of power characteristics of respective RF signals received by the mobile station 600 from corresponding first and second sector antennas 610, 612 of the serving base station 608. The current angular position may also be based on additional signal strength measurements from other sector antennas 614 (e.g., sector antenna N).

In this embodiment, the apparatus may also include a location module 616 in operative communication with the distance module 604 and angular position module 606 for identifying a current geographic location of the mobile station 600 in a coverage area of the wireless network 602 in a geographic notation based at least in part on combining the radial distance and current angular position of the mobile station 600 relative to the serving base station 608. In one embodiment, the radial distance and current angular position reflect a polar coordinate-type of geographic notation in reference to the serving base station. In other embodiments, the radial distance and current angular position can be converted into various types of geographic notation, such as a latitude/longitude notation, an address notation, or a geo-bin tile grid notation associated with the coverage area for the wireless network.

In the embodiment being described, the apparatus may also include an output module 618 in operative communication with the location module 616 for sending the current geographic location of the mobile station 600 in the geographic notation to a geo-location storage node 620 associated with the wireless network 602. The geo-location storage node 620 may be internal or external to the wireless network 602. In this embodiment, the apparatus may include the serving base station 608. In this embodiment, the serving base station 608 may include the distance module 604, angular position module 606, location module 616, and output module 618.

Figure 7:
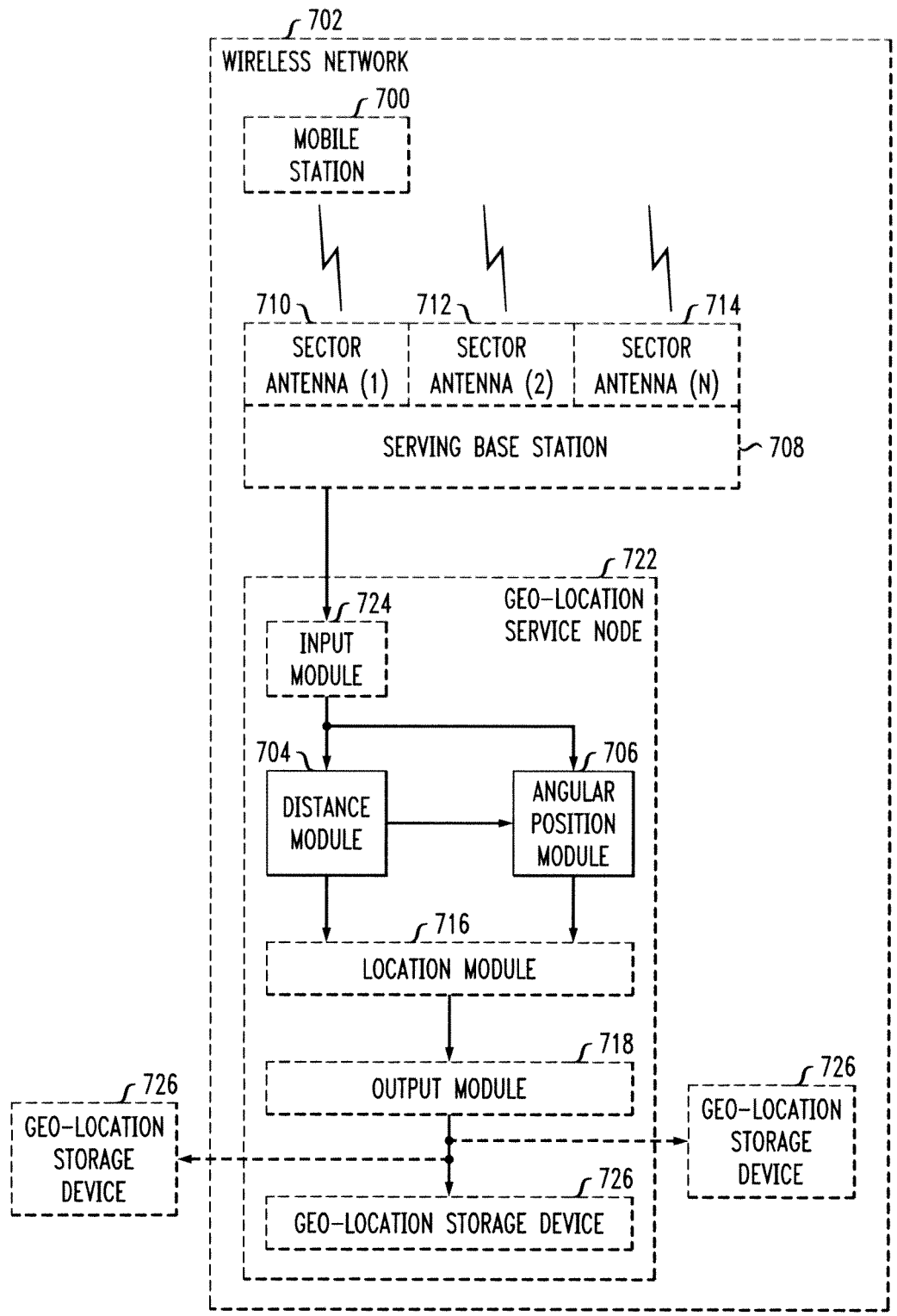
FIG. 7 is a block diagram of an exemplary embodiment of an apparatus within a geo-location service node of a wireless network for estimating a geographic location of a mobile station within a coverage area of the wireless network.

With reference to FIG. 7, an exemplary embodiment of an apparatus for estimating a geographic location of a mobile station 700 within a coverage area of a wireless network 702 includes a distance module 704 and an angular position module 706. The distance module 704 determines a radial distance of the mobile station 700 from a base station 708 serving the mobile station 700. The radial distance is based at least in part on a round trip measurement associated with elapsed time between sending an outgoing signal from the base station 708 to the mobile station 700 and receiving a corresponding acknowledgement signal from the mobile station 700 at the base station 708. The angular position module 706 is in operative communication with the distance module 704 and calculates a current angular position of the mobile station 700 in relation to the radial distance from the serving base station 708. The current angular position is based at least in part on a first signal strength measurement, a second signal strength measurement, and an angular position reference that extends outward from the serving base station 708. The first and second signal strength measurements representative of power characteristics of respective RF signals received by the mobile station 700 from corresponding first and second sector antennas 710, 712 of the serving base station 708. The current angular position may also be based on additional signal strength measurements from other sector antennas 714 (e.g., sector antenna N).

In this embodiment, the apparatus may also include a location module 716 in operative communication with the distance module 704 and angular position module 706 for identifying a current geographic location of the mobile station 700 in a coverage area of the wireless network 702 in a geographic notation based at least in part on combining the radial distance and current angular position of the mobile station 700 relative to the serving base station 708.

In the embodiment being described, the apparatus may include a geo-location service node 722 associated with the wireless network 702 and in operative communication with the serving base station 708. In this embodiment, the geo-location service node 722 may include the distance module 704, angular position module 706, and location module 716.

The geo-location service node 722 may also include an input module 724 and an output module 718. The input module 724 in operative communication with the distance module 704 and angular position module 706 for receiving the round trip measurement, first signal strength measurement, and second signal strength measurement from the serving base station 708 via the wireless network 702. The output module 718 in operative communication with the location module 716 for sending the current geographic location of the mobile station 700 in the geographic notation to a geo-location storage device 726 associated with the geo-location service node 722. The geo-location storage device 726 may be internal or external to the geo-location service node 722. If the geo-location storage device 726 is external to the geo-location service node 722, the geo-location storage device 726 may be internal or external to the wireless network 702.

With reference to FIG. 8, an exemplary embodiment of an apparatus for estimating a geographic location of a mobile station 800 within a coverage area of a wireless network 802 includes a distance module 804 and an angular position module 806. The distance module 804 determines a radial distance of the mobile station 800 from a base station 808 serving the mobile station 800. The radial distance is based at least in part on a round trip measurement associated with elapsed time between sending an outgoing signal from the base station 808 to the mobile station 800 and receiving a corresponding acknowledgement signal from the mobile station 800 at the base station 808. The angular position module 806 is in operative communication with the distance module 804 and calculates a current angular position of the mobile station 800 in relation to the radial distance from the serving base station 808. The current angular position is based at least in part on a first signal strength measurement, a second signal strength measurement, and an angular position reference that extends outward from the serving base station 808. The first and second signal strength measurements representative of power characteristics of respective RF signals received by the mobile station 800 from corresponding first and second sector antennas 810, 812 of the serving base station 808. The current angular position may also be based on additional signal strength measurements from other sector antennas 814 (e.g., sector antenna N).

In this embodiment, the apparatus may also include a location module 816 in operative communication with the distance module 804 and angular position module 806 for identifying a current geographic location of the mobile station 800 in a coverage area of the wireless network 802 in a geographic notation based at least in part on combining the radial distance and current angular position of the mobile station 800 relative to the serving base station 808.

In the embodiment being described, the apparatus may include a network management node 828 associated with the wireless network 802 and in operative communication with the serving base station 808. In this embodiment, the network management node 828 may include the distance module 804, angular position module 806, and location module 816.

The network management node 828 may also include an input module 824, a measurements storage device 830, and an output module 818. The input module 824 for receiving the round trip measurement, first signal strength measurement, and second signal strength measurement from the serving base station 808 via the wireless network 802. The measurements storage device 830 in operative communication with the input module 824, distance module 804, and angular position module 806 for storing the round trip measurement, first signal strength measurement, and second signal strength measurement. In this embodiment, the distance module 804 retrieves the round trip measurement from the measurements storage device 830 in conjunction with determining the radial distance. Similarly, the angular position module 806 retrieves the first and second signal strength measurements from the measurements storage device 830 in conjunction with calculating the current angular position. The output module 818 in operative communication with the location module 816 for sending the current geographic location of the mobile station 800 in the geographic notation to the geo-location storage device 826. The geo-location storage device 826 may be internal or external to the network management node 828. If the geo-location storage device 826 is external to the network management node 828, the geo-location storage device 826 may be internal or external to the wireless network 802.

With reference to FIG. 9, an exemplary embodiment of an angular position module 906 associated with the apparatus of FIGS. 6-8 may include a source data communication sub-module 932 and a first angular component sub-module 938. The source data communication sub-module 932 for retrieving first and second transmit parameter values from a storage device 936 associated with the wireless network. The first and second transmit parameter values representative of power characteristics of respective communication signals to be transmitted by the corresponding first and second sector antennas (e.g., 610, 612). In this embodiment, the first angular component sub-module 938 is in operative communication with the source data communication module 932 for determining a difference between the first and second transmit parameter values to obtain a first angular position component.

In a further embodiment of the angular position module 906, the source data communication module may retrieve the first and second signal strength measurements from the storage device 936. In this embodiment, the angular position module 906 may also include a second angular component module 940 in operative communication with the source data communication module 932 for determining a difference between the first and second signal strength measurements to obtain a second angular position component.

In a yet further embodiment of the angular position module 906, the source data communication sub-module 932 may also retrieve a first antenna elevation gain parameter value, a first antenna maximum gain parameter value, and a first antenna azimuth gain parameter characteristic from the storage device 936. The first antenna azimuth gain parameter characteristic relating first antenna azimuth gain parameter values to variable azimuth positions with respect to the angular position reference. The variable azimuth positions representative of prospective azimuth positions of the mobile station 900 in relation to the angular position reference. The first antenna azimuth gain parameter characteristic based at least in part on a first antenna position value representative of a first azimuth position at which the first sector antenna 910 is oriented in relation to the angular position reference.

In this embodiment, the source data communication sub-module 932 may also retrieve a second antenna elevation gain parameter value, a second antenna maximum gain parameter value, and a second antenna azimuth gain parameter characteristic from the storage device 936. The second antenna azimuth gain parameter characteristic relating second antenna azimuth gain parameter values to the variable azimuth positions. The second antenna azimuth gain parameter characteristic based at least in part on a second antenna position value representative of a second azimuth position at which the second sector antenna 912 is oriented in relation to the angular position reference.

In the embodiment being described, the angular position module 906 may also include a third angular component sub-module 934 in operative communication with the source data communication sub-module 932. The third angular component sub-module 934 for selecting an angular value (e.g., not exceeding 360) for the variable azimuth position. The third angular component sub-module 934 using the first and second antenna azimuth gain parameter characteristics to identify the corresponding first and second antenna azimuth gain parameter values for the variable azimuth position associated with the selected angular value.

In this embodiment, the third angular component sub-module 934 may also determine a difference between first and second transmit antenna gains for the selected angular value. The difference may be determined by adding the first antenna azimuth gain parameter value for the selected angular value to the first antenna elevation gain parameter value and subtracting the first antenna maximum gain parameter value to obtain the first transmit antenna gain, adding the second antenna azimuth gain parameter value for the selected angular value to the second antenna elevation gain parameter value and subtracting the second antenna maximum gain parameter value to obtain the second transmit antenna gain, and subtracting the second transmit antenna gain from the first transmit antenna gain to obtain a third angular position component.

The angular value selected for the initial variable azimuth position can be based at least in part on knowledge of which sector antenna is serving the mobile station and the orientation and azimuth position of the serving sector antenna. Subsequent values selected for the variable azimuth position can be based on whether the subsequent result is approaching or receding from the desired result. Various techniques can also be used to select subsequent values for the variable azimuth position based on the magnitude of the difference between the subsequent result and the desired result as well as the change in the difference between consecutive subsequent results and the desired result.

For example, in a further embodiment of the angular position module 906, the angular value initially selected for the variable azimuth position by the third angular component sub-module 934 may be between the first and second antenna position values. In this embodiment, the initial angular value may be representative of a mid-point between the first and second antenna position values. In other words, if the first antenna is oriented to 120 degrees in relation to the angular reference position, a second antenna may be oriented to 240 degrees, and 180 may be selected as the initial angular value for the variable azimuth position because it is at a midpoint between the first and second sector antennas. The selection of other angular values for the variable azimuth position can take into account whether the results are getting better or worse to select angular values to obtain better results. The iterative selection of angular values can be incremental or based on a factor of the difference between the obtained result and the desired result.

In a yet further embodiment, the angular position module 906 may include an arithmetic sub-module 942 and a control sub-module 944. In this embodiment, the arithmetic sub-module 942 is in operative communication with the first, second, and third angular component modules 938, 940, 934 for adding the first and third angular position components and subtracting the second angular position component to form an arithmetic result. In the embodiment being described, the arithmetic sub-module 942 converts the arithmetic result to an absolute value. The control sub-module 944 is in operative communication with the arithmetic sub-module 942 and the third angular component sub-module 934 for identifying the angular value substituted for the variable azimuth position as the current angular position for the mobile station 900 if the arithmetic result is within a predetermined threshold of a desired value (e.g., zero). Otherwise, the control sub-module 944 may causes the third angular component module 934 to repeat the selecting with a different angular value and the determining of the difference between the first and second transmit gains to obtain a new value for the third angular position component, causes the arithmetic sub-module 942 to repeat the adding and subtracting to form the arithmetic result and the determining of the absolute value, and causes the repeating to continue until the arithmetic result is within the predetermined threshold of the desired value.

In an alternate further embodiment, the arithmetic sub-module 942 may be in operative communication with the first, second, and third angular component modules 938, 940, 934 for adding the first and third angular position components and subtracting the second angular position component to form an arithmetic result. In the embodiment being described, the arithmetic sub-module 942 converts the arithmetic result to an absolute value. In this embodiment, the control sub-module 944 may be in operative communication with the arithmetic sub-module 942 and the third angular component module 934 for causing the third angular component sub-module 934 to repeat the selecting with a different angular value and the determining of the difference between the first and second transmit gains to obtain a new value for the third angular position component, causing the arithmetic sub-module 942 to repeat the adding and subtracting to form the arithmetic result and the determining of the absolute value, and causing the repeating to continue until the absolute value is minimized. In the embodiment being described, the control sub-module 944 identifies the corresponding angular value substituted for the variable azimuth position for which the absolute value is minimized as the current angular position for the mobile station 900.

In another alternate further embodiment, the arithmetic sub-module 942 may be in operative communication with the first, second, and third angular component modules 938, 940, 934 for summing the first and third angular position components to form an arithmetic result. In the embodiment being described, the arithmetic sub-module 942 compares the arithmetic result to the second angular position component 940. In this embodiment, the control sub-module 944 may be in operative communication with the arithmetic sub-module 942 and the third angular component sub-module 934 for identifying the angular value substituted for the variable azimuth position as the current angular position for the mobile station if the arithmetic result is within a predetermined range of the second angular position component. Otherwise, the control sub-module 944 causes the third angular component module 934 to repeat the selecting with a different angular value and the determining of the difference between the first and second transmit gains to obtain a new value for the third angular position component, causes the arithmetic sub-module 942 to repeat the summing of the first and third angular position components to form the arithmetic result and the comparing of the arithmetic result to the second angular position component, and cause the repeating to continue until the arithmetic result is within the predetermined range of the second angular position component.

With reference to FIG. 10, an exemplary embodiment of a non-transitory computer-readable medium storing program instructions that, when executed by a computer, cause a corresponding computer-controlled device to perform a process 1000 for estimating a geographic location of a mobile station within a coverage area of a wireless network. In one embodiment, the process 1000 begins at 1002 where a radial distance of a mobile station from a base station is calculated. The base station including multiple sector antennas. The radial distance is based at least in part on a round trip measurement associated with elapsed time between sending an outgoing signal from the base station to the mobile station and receiving a corresponding acknowledgement signal from the mobile station at the base station. At 1004, the process determines a signal strength report from the mobile station provided to the base station includes a signal strength measurement representative of a power characteristic of an RF signal received by the mobile station from a sector antenna of the base station. Next, an instant geographic location of the mobile station in a coverage area of the wireless network may be identified (1006).

In various embodiments, the program instructions stored in the non-transitory computer-readable memory, when executed by the computer, may cause the computer-controlled device to perform various combinations of functions associated with the various embodiments of the processes 400, 500, 1700, 1800, 1900, 2000, 2100, 2200, and 2300 for estimating a geographic location of a mobile station described above with reference to FIGS. 4, 5, and 17-23. In other words, the various embodiments of the processes 400, 500, 1700, 1800, 1900, 2000, 2100, 2200, and 2300 described above may also be implemented by corresponding embodiments of the process 1000 associated with the program instructions stored in the non-transitory computer-readable memory.

Likewise, in various embodiments, the program instructions stored in the non-transitory computer-readable memory, when executed by the computer, may cause the computer-controlled device to perform various combinations of functions associated with the various embodiments of the apparatus for estimating a geographic location of a mobile station described above with reference to FIGS. 6-8 and the angular position module 906 described above with reference to FIG. 9.

For example, the computer-controlled device may include a base station (see FIG. 6, 608), a geo-location service node (see FIG. 7, 722), a network management node (see FIG. 8, 828), or any suitable communication node associated with the wireless network. Any suitable module or sub-module described above with reference to FIGS. 6-9 may include the computer and non-transitory computer-readable memory associated with the program instructions. Alternatively, the computer and non-transitory computer-readable memory associated with the program instructions may be individual or combined components that are in operative communication with any suitable combination of the modules and sub-modules described above with reference to FIGS. 6-9

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for mapping an operating parameter in a coverage area of a wireless network, comprising:

at a network management node, obtaining parameter measurements for a select operating parameter associated with one or more mobile stations operating in at least a select portion of a network coverage area for a wireless network, the parameter measurements having been measured during a select calendar timeframe, the network coverage area formed by a plurality of base stations, each base station defining a cellular coverage area within the network coverage area, the select portion of the network coverage area formed by at least one base station, each at least one base station including multiple sector antennas, each sector antenna defining a sector coverage area within the cellular coverage area for the corresponding base station, wherein the network management node is associated with the wireless network; and for each obtained parameter measurement, estimating an instant geographic location of the corresponding mobile station in relation to the at least one base station serving the corresponding mobile station, each instant geographic location based at least in part on a round trip measurement and at least one signal strength measurement associated with the corresponding mobile station, each round trip measurement associated with the at least one base station serving the corresponding mobile station, each round trip measurement and corresponding at least one signal strength measurement related in calendar time to the corresponding parameter measurement.

2. The method of claim 1, further comprising:

processing the obtained parameter measurements for each instant geographic location to obtain a representative parameter value for the corresponding instant geographic location; and populating a coverage area map for the wireless network with the representative parameter values based at least in part on the instant geographic location associated with the corresponding representative parameter value, the coverage area map including at least the select portion of the network coverage area.

3. The method of claim 2 wherein the representative parameter values are obtained by one or more of filtering the corresponding parameter measurements to remove unreliable measurements, averaging the corresponding parameter measurements, determining a median value for the corresponding parameter measurements, and selecting a preferred parameter measurement from the corresponding parameter measurements based at least in part on a preferred calendar time for the corresponding representative parameter value.

4. The method of claim 2 wherein the coverage area map is a radio frequency (RF) coverage area map, a handoff zone coverage area map, a data usage coverage area map, a signaling usage coverage area map, a population coverage area map for directory number identification, device identification, device type, or application program, a quality of service coverage area map for throughput, packet loss, or packet delay, or a user profile coverage area map.

5. The method of claim 1 wherein at least the select portion of the network coverage area is represented in a coverage area map for the wireless network by a plurality of sub-sector geographic areas, each sub-sector geographic area uniquely identified and associated with at least a portion of the sector coverage area for at least one sector antenna, the method further comprising:

correlating each estimated instant geographic location with a sub-sector geographic area of the plurality of sub-sector geographic areas, each sub-sector geographic area adapted to represent more than one instant geographic location, the correlating based at least in part on a reference location in the coverage area map for the at least one base station serving the mobile station associated with the corresponding instant geographic location.

6. The method of claim 5, further comprising:

processing the obtained parameter measurements for each sub-sector geographic area to obtain a representative parameter value for the corresponding sub-sector geographic area; and populating the coverage area map with the representative parameter values based at least in part on the sub-sector geographic area associated with the corresponding representative parameter value.

7. The method of claim 5 wherein each sub-sector geographic area is associated with a corresponding geographic location bin for storage of parameter measurements associated with the instant geographic locations represented by the corresponding sub-sector geographic, the method further comprising:

storing each obtained parameter measurement in a geographic location bin associated with the sub-sector geographic area representing the instant geographic location associated with the corresponding parameter measurement;

processing the parameter measurements stored in each geographic location bin to obtain a representative parameter value for the corresponding geographic location bin; and populating the coverage area map with the representative parameter values based at least in part on the geographic location bin associated with the corresponding representative parameter value and the sub-sector geographic area associated with the corresponding geographic location bin.

8. The method of claim 1 wherein the parameter measurements are obtained from call records, subscriber records, and service provider records captured or maintained during normal operation of the wireless network that provide wireless services to mobile stations or that support accounting and billing functions for the service provider.

9. The method of claim 1 wherein the select operating parameter includes one or more of a signal strength parameter associated with radio frequency (RF) signals received by mobile stations from sector antennas, a handoff parameter associated with handoffs of mobile stations from serving sector antennas to neighboring sector antennas of serving base stations or neighboring base stations, a data usage parameter associated with data usage during call sessions to and from mobile stations, a signaling usage parameter associated with setup and teardown of call sessions to and from mobile stations, a directory number identification parameter associated with telephone numbers for mobile stations, a device identification parameter associated with serial numbers of mobile stations, a device type parameter associated with categorizing mobile stations into different types by manufacturer, model, or technical feature, an application identification parameter associated with application programs used by mobile stations, a throughput parameter associated with call sessions for mobile stations, a packet loss parameter associated with call sessions for mobile stations, a packet delay parameter associated with call sessions for mobile stations, and a user profile parameter associated with observed behavior or preferences of users of mobile stations.

10. The method of claim 1 wherein the select portion of the network coverage area is formed by at least two base stations, each at least two base stations including multiple sector antennas.

11. The method of claim 1 wherein at least some instant geographic locations are based at least in part on the round trip measurement and first and second signal strength measurements of the at least one signal strength measurement, the first and second signal strength measurements being from different sector antennas.

12. The method of claim 1 wherein at least some instant geographic locations are based at least in part on the round trip measurement, a first signal strength measurement of the at least one signal strength measurement, and a first RF coverage map for a first sector antenna serving the mobile station associated with the round trip measurement and with which the first signal strength measurement is associated.

13. The method of claim 12 wherein one or more instant geographic locations are also based at least in part on a second signal strength measurement of the at least one signal strength measurement and a second RF coverage map for a second sector antenna with which the second signal strength measurement is associated, the second sector antenna associated with a neighboring base station in relation to the base station serving the mobile station.

14. The method of claim 1 wherein parameter measurements are obtained and the instant geographic locations are estimated in response to detection of a dropped call for the one or more mobile stations.

15. An apparatus for mapping an operating parameter in a coverage area of a wireless network, comprising:

an input module configured to obtain parameter measurements for a select operating parameter associated with one or more mobile stations operating in at least a select portion of a network coverage area for a wireless network, the parameter measurements having been measured during a select calendar timeframe, the network coverage area formed by a plurality of base stations, each base station defining a cellular coverage area within the network coverage area, the select portion of the network coverage area formed by at least one base station, each at least one base station including multiple sector antennas, each sector antenna defining a sector coverage area within the cellular coverage area for the corresponding base station; and a location module in operative communication with the input module and configured to estimate an instant geographic location of the corresponding mobile station for each obtained parameter measurement in relation to the at least one base station serving the corresponding mobile station, each instant geographic location based at least in part on a round trip measurement and at least one signal strength measurement associated with the corresponding mobile station, the round trip and at least one signal strength measurements obtained via the input module, each round trip measurement associated with the at least one base station serving the corresponding mobile station, each round trip measurement and corresponding at least one signal strength measurement related in calendar time to the corresponding parameter measurement.

16. The apparatus of claim 15, further comprising:

a processing module in operative communication with the input module and location module and configured to process the obtained parameter measurements for each instant geographic location to obtain a representative parameter value for the corresponding instant geographic location; and a mapping module in operative communication with the processing module and configured to populate a coverage area map for the wireless network with the representative parameter values based at least in part on the instant geographic location associated with the corresponding representative parameter value, the coverage area map including at least the select portion of the network coverage area.

17. The apparatus of claim 15 wherein at least the select portion of the network coverage area is represented in a coverage area map for the wireless network by a plurality of sub-sector geographic areas, each sub-sector geographic area uniquely identified and associated with at least a portion of the sector coverage area for at least one sector antenna, the apparatus further comprising:

a correlation module in operative communication with the location module and configured to correlate each estimated instant geographic location with a sub-sector geographic area of the plurality of sub-sector geographic areas, each sub-sector geographic area adapted to represent more than one instant geographic location, the correlating based at least in part on a reference location in the coverage area map for the at least one base station serving the mobile station associated with the corresponding instant geographic location.

18. The apparatus of claim 17, further comprising:

a processing module in operative communication with the input module and correlating module and configured to process the obtained parameter measurements for each sub-sector geographic area to obtain a representative parameter value for the corresponding sub-sector geographic area; and a mapping module in operative communication with the processing module and configured to populate the coverage area map with the representative parameter values based at least in part on the sub-sector geographic area associated with the corresponding representative parameter value.

19. The apparatus of claim 17 wherein each sub-sector geographic area is associated with a corresponding geographic location bin for storage of parameter measurements associated with the instant geographic locations represented by the corresponding sub-sector geographic, the apparatus further comprising:

a storage device in operative communication with the input module and the location module and configured to store each obtained parameter measurement in a geographic location bin associated with the sub-sector geographic area representing the instant geographic location associated with the corresponding parameter measurement, wherein the storage device also stores the round trip and signal strength measurements used by the location module;

a processing module in operative communication with the storage device and correlating module and configured to process the parameter measurements stored in each geographic location bin to obtain a representative parameter value for the corresponding geographic location bin; and a mapping module in operative communication with the processing module and configured to populate the coverage area map with the representative parameter values based at least in part on the geographic location bin associated with the corresponding representative parameter value and the sub-sector geographic area associated with the corresponding geographic location bin.

20. A non-transitory computer-readable medium storing program instructions that, when executed by a computer, cause a corresponding computer-controlled device to perform a method for mapping an operating parameter in a coverage area of a wireless network, the method comprising:

obtaining parameter measurements for a select operating parameter associated with one or more mobile stations operating in at least a select portion of a network coverage area for a wireless network, the parameter measurements having been measured during a select calendar timeframe, the network coverage area formed by a plurality of base stations, each base station defining a cellular coverage area within the network coverage area, the select portion of the network coverage area formed by at least one base station, each at least one base station including multiple sector antennas, each sector antenna defining a sector coverage area within the cellular coverage area for the corresponding base station; and for each obtained parameter measurement, estimating an instant geographic location of the corresponding mobile station in relation to the at least one base station serving the corresponding mobile station, each instant geographic location based at least in part on a round trip measurement and at least one signal strength measurement associated with the corresponding mobile station, each round trip measurement associated with the at least one base station serving the corresponding mobile station, each round trip measurement and corresponding at least one signal strength measurement related in calendar time to the corresponding parameter measurement.

21. The non-transitory computer-readable medium of claim 20, the method further comprising:

processing the obtained parameter measurements for each instant geographic location to obtain a representative parameter value for the corresponding instant geographic location; and populating a coverage area map for the wireless network with the representative parameter values based at least in part on the instant geographic location associated with the corresponding representative parameter value, the coverage area map including at least the select portion of the network coverage area.

22. The non-transitory computer-readable medium of claim 20 wherein at least the select portion of the network coverage area is represented in a coverage area map for the wireless network by a plurality of sub-sector geographic areas, each sub-sector geographic area uniquely identified and associated with at least a portion of the sector coverage area for at least one sector antenna, the method further comprising:

correlating each estimated instant geographic location with a sub-sector geographic area of the plurality of sub-sector geographic areas, each sub-sector geographic area adapted to represent more than one instant geographic location, the correlating based at least in part on a reference location in the coverage area map for the at least one base station serving the mobile station associated with the corresponding instant geographic location.

23. The non-transitory computer-readable medium of claim 22, the method further comprising:

processing the obtained parameter measurements for each sub-sector geographic area to obtain a representative parameter value for the corresponding sub-sector geographic area; and populating the coverage area map with the representative parameter values based at least in part on the sub-sector geographic area associated with the corresponding representative parameter value.

24. The non-transitory computer-readable medium of claim 22 wherein each sub-sector geographic area is associated with a corresponding geographic location bin for storage of parameter measurements associated with the instant geographic locations represented by the corresponding sub-sector geographic, the method further comprising:

storing each obtained parameter measurement in a geographic location bin associated with the sub-sector geographic area representing the instant geographic location associated with the corresponding parameter measurement;

processing the parameter measurements stored in each geographic location bin to obtain a representative parameter value for the corresponding geographic location bin; and populating the coverage area map with the representative parameter values based at least in part on the geographic location bin associated with the corresponding representative parameter value and the sub-sector geographic area associated with the corresponding geographic location bin.

* * * * *